United States Patent [19]

Berman et al.

[11] 4,365,275
[45] Dec. 21, 1982

[54] METHOD FOR PRODUCING IMAGES ON RADIATION SENSITIVE RECORDING MEDIUMS

[75] Inventors: Richard M. Berman; Ernest B. Feldgus, both of Dresher, Pa.

[73] Assignee: Delta Scan, Inc., Willow Grove, Pa.

[21] Appl. No.: 261,957

[22] Filed: May 8, 1981

[51] Int. Cl.³ .............................................. H04M 1/40
[52] U.S. Cl. .................................. 358/283; 358/287; 358/298
[58] Field of Search ............... 358/283, 287, 298, 302; 355/50, 68

[56]     References Cited
        U.S. PATENT DOCUMENTS

| | | |
|---|---|---|
| 2,015,344 | 9/1935 | Kosken . |
| 2,951,736 | 9/1960 | Black . |
| 2,982,175 | 5/1961 | Eisler . |
| 3,020,805 | 2/1962 | Goddard . |
| 3,217,594 | 11/1965 | Simmon . |
| 3,322,030 | 5/1967 | Silverman . |
| 3,455,329 | 7/1969 | Roth . |
| 3,464,330 | 9/1969 | Lewis . |
| 3,496,542 | 2/1970 | Rabinow . |
| 3,613,532 | 10/1971 | Wildhaber . |
| 3,625,686 | 12/1971 | Kitano . |
| 3,686,675 | 8/1972 | Faul et al. . |
| 3,806,641 | 4/1974 | Crooks . |
| 3,823,335 | 7/1974 | Scheffels et al. . |
| 3,824,604 | 7/1974 | Stein . |
| 3,825,336 | 7/1974 | Reynolds . |
| 3,834,803 | 9/1974 | Tsukada . |
| 3,836,917 | 9/1974 | Mee . |
| 3,903,527 | 9/1975 | Frehling . |
| 3,944,362 | 3/1976 | Dailey . |
| 3,952,311 | 4/1976 | Lapeyre . |
| 3,956,583 | 5/1976 | Pugsley . |
| 3,956,587 | 5/1976 | Nelson . |
| 3,977,007 | 8/1976 | Berry et al. ........................ 358/298 |
| 3,982,829 | 9/1976 | Hirth . |
| 3,997,911 | 12/1976 | Perriman et al. . |
| 4,003,061 | 1/1977 | LaCanfora . |
| 4,012,584 | 3/1977 | Gascoigne . |
| 4,025,189 | 5/1977 | Pugsley . |
| 4,038,493 | 7/1977 | Richards . |
| 4,042,389 | 8/1977 | Yevick . |
| 4,048,486 | 9/1977 | Krieg . |
| 4,057,338 | 11/1977 | Yevick . |
| 4,083,632 | 4/1978 | Mailloux et al. . |
| 4,084,259 | 4/1978 | Cahill et al. ........................ 358/298 |
| 4,093,964 | 6/1978 | Aughton . |
| 4,110,796 | 8/1978 | Aughton . |
| 4,135,212 | 1/1979 | Pugsley et al. . |
| 4,185,304 | 1/1980 | Holladay ........................... 358/298 |
| 4,210,936 | 7/1980 | Cinque et al. ..................... 358/298 |

OTHER PUBLICATIONS

RCA Technical Notes No. 645, dated Aug. 1965, The Lithographers Manual, Fifth Edition Edited by Charles Shapiro.

Primary Examiner—Robert L. Griffin
Assistant Examiner—Edward L. Coles
Attorney, Agent, or Firm—Lerner, David, Littenberg & Samuel

[57]     ABSTRACT

A method for producing images on radiation sensitive recording mediums. The method comprises the steps of providing radiation means 20 operable to produce radiation 30 at a predetermined location from the radiation means 20, and mounting a radiation sensitive recording medium 12 and the radiation means 20 to provide relative movement between the recording medium 12 and the radiation means 20 so that respective portions of the recording medium 12 are presented at the predetermined location from the radiation means 20. The radiation means 20 is operated as the radiation means 20 and recording means 12 move relative to one another to expose the recording medium 12 with radiation 30 in a pattern of dot areas 40 to produce an image, at least one of the dot areas 40 including at least one subdot area 42 having a density which is below a predetermined value, and thereafter manipulating at least one portion of the at least one subdot areas 42 so as to modify the size of the exposed dot area 40 to thereby produce the desired image.

12 Claims, 36 Drawing Figures

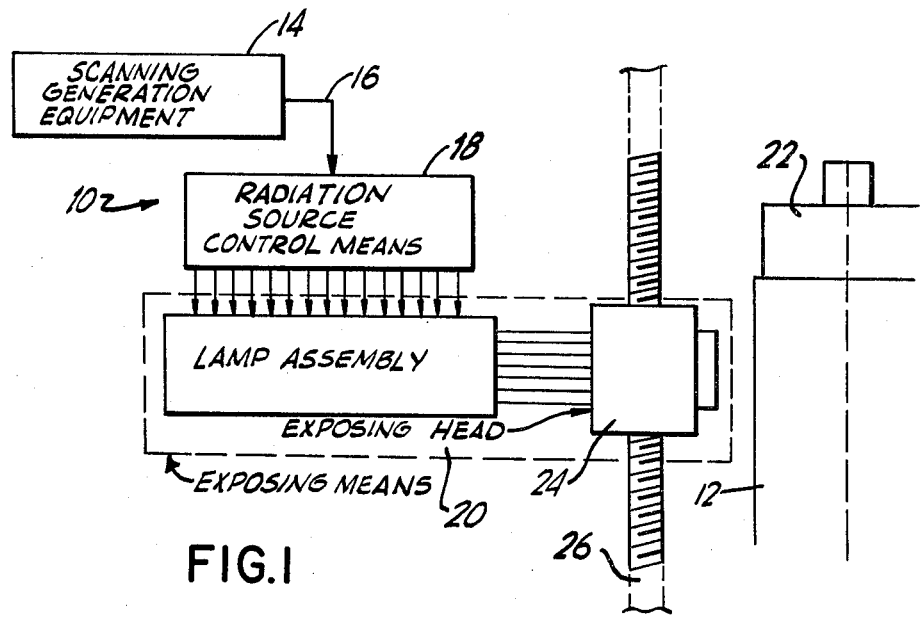
FIG.1
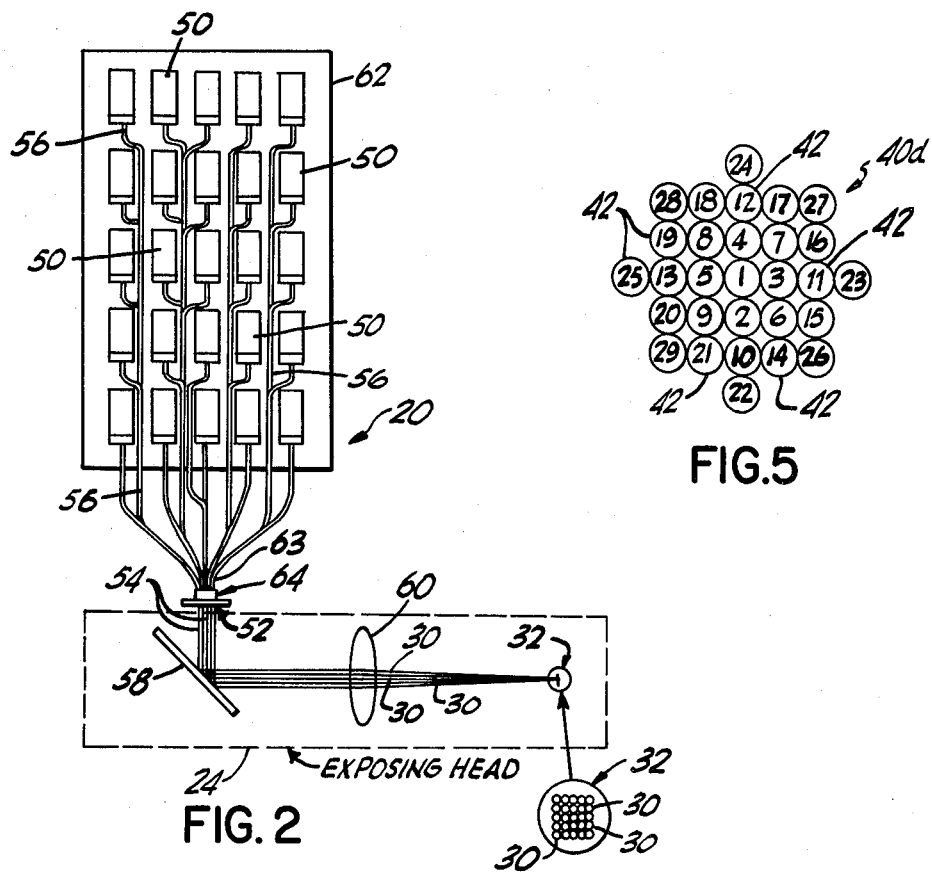
FIG.5
FIG.2

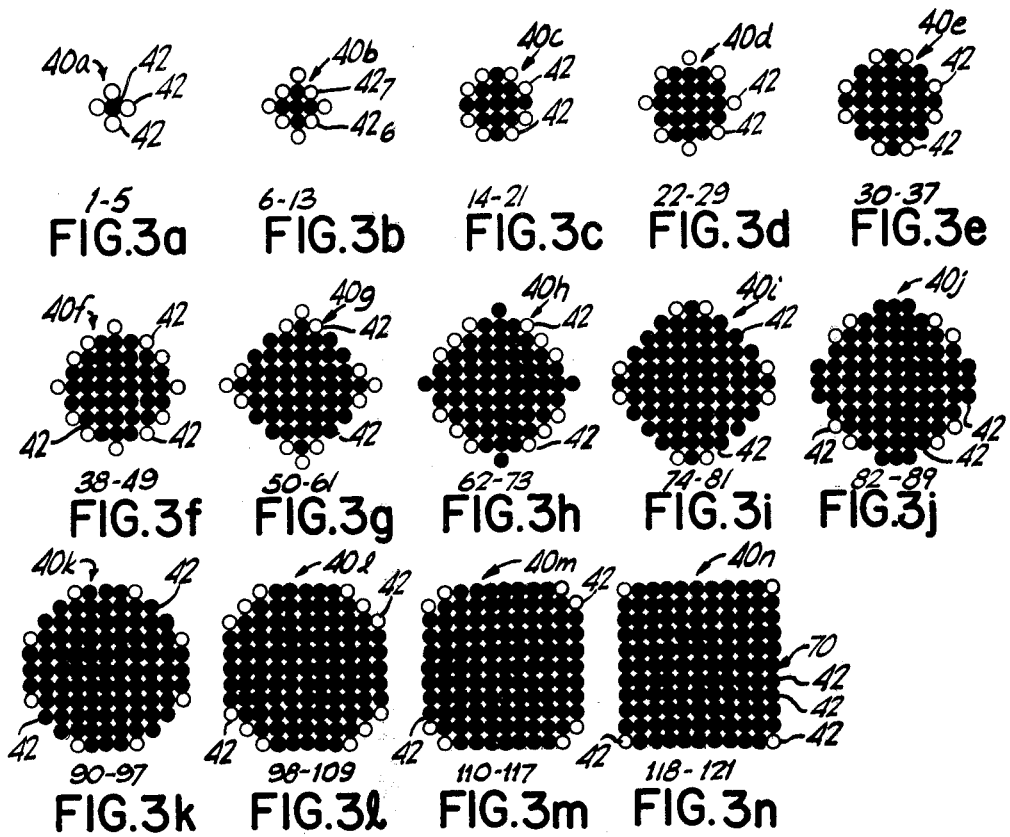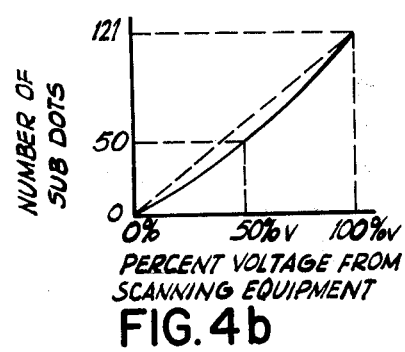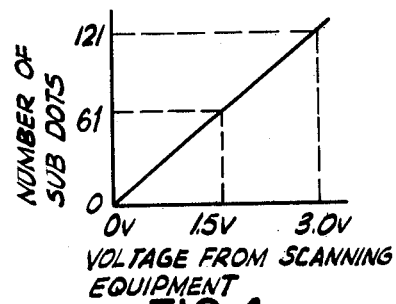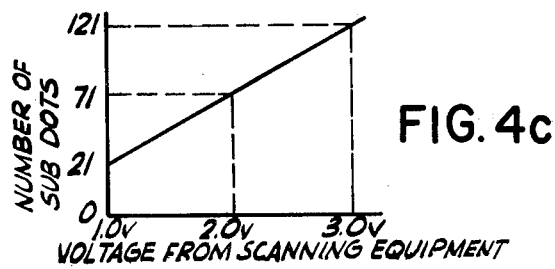

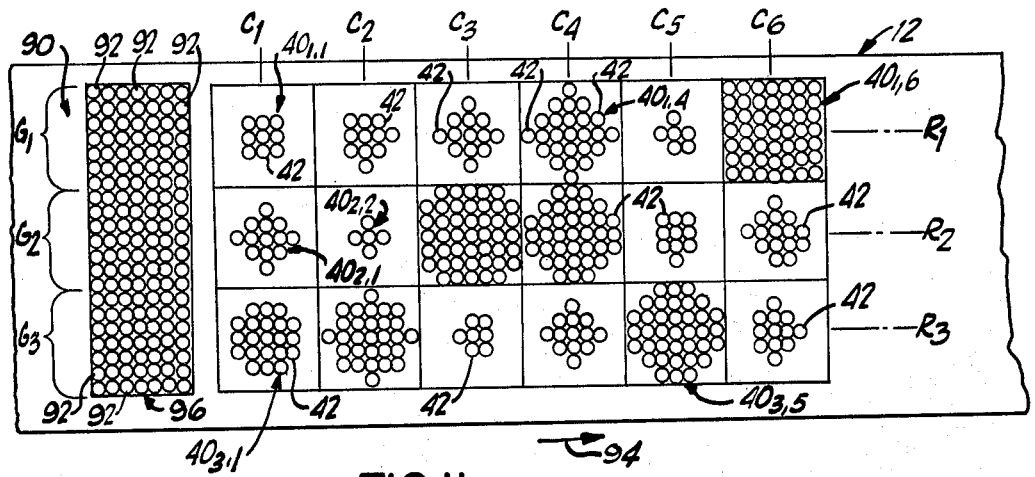
FIG.11
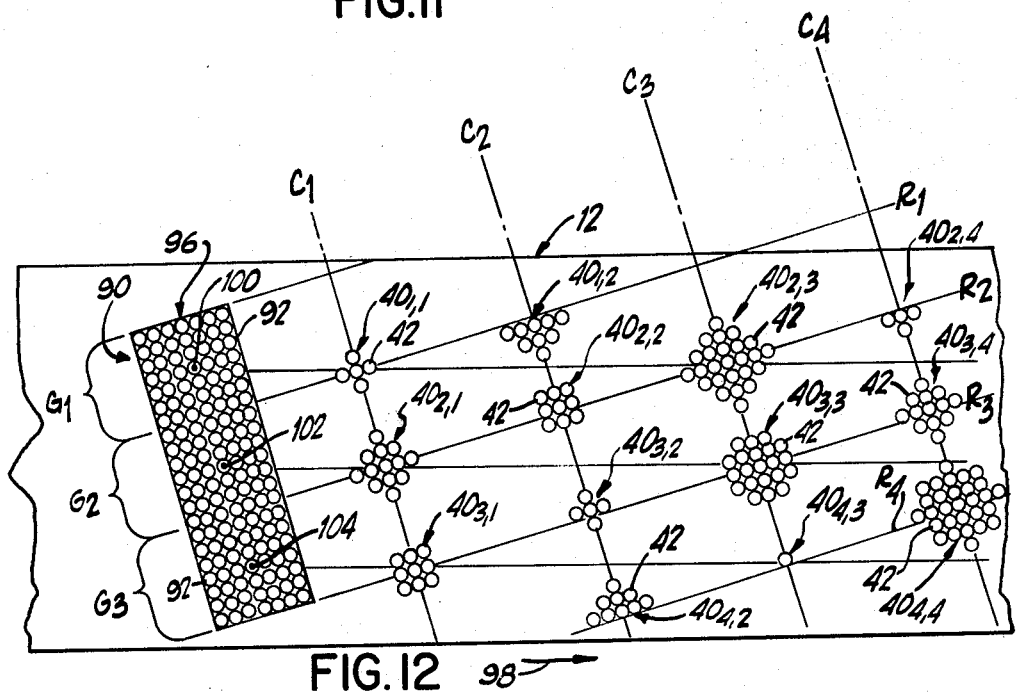
FIG.12
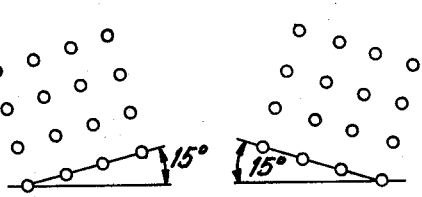
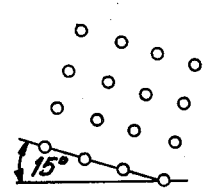
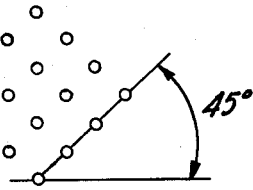
FIG.10a  FIG.10b  FIG.10c  FIG.10d

METHOD FOR PRODUCING IMAGES ON RADIATION SENSITIVE RECORDING MEDIUMS

BACKGROUND OF THE INVENTION

The present invention relates to a method for producing images on radiation sensitive recording mediums. The present invention is particularly useful in producing halftone images of an original image, although the method may also be used for producing other types of images such as alphanumeric characters on radiation sensitive recording mediums.

Printing processes commonly used in the graphic arts industry, i.e., newspapers, books, magazines, etc., involve depositing a series of dots of ink on a paper whenever it is desired to print all or a portion of an image, and depositing no ink when the absence of an image is desired. With such processes, when pictures such as photographs or prints are to be printed, the continuous tones of the original image are transformed into halftone images which are typically produced by a large number of ink dots of various sizes. The size of the ink dots correspond to the shades or tones to be reproduced. When the largest dots, and the spaces on the paper between the dots, are made small compared with the visual acuity of the human eye, i.e., they are subliminal to the eye, the dots and paper fuse visually and create or simulate various shades of continuous tones.

In the printing of color images, a series of separate halftone images are typically produced, one for each different color. These separate halftone images are processed in a conventional manner to provide a corresponding series of printing plates having halftone dots thereon. The printing plates are then used to print each of the different colors, such as by an offset process, on a recording medium such as paper so that the different colored dots from the different plates are superimposed over or adjacent to one another on the recording medium. The composite as a result of this printing process thus produces an image which simulates the original image. Generally, in such conventional systems, the different halftone images have the dots thereof oriented at different screen angles to minimize undesirable moire effects.

In accordance with early prior art methods and apparatus for producing halftone images on a film, a light image of an original (such as by passing light through a photographic negative) is directed through a halftone screen element onto a film to thereby expose the film in a series of dots which simulate the light image of the original. The screen element consists of two series of parallel lines oriented at right angles, and produces a dot image in which the highlights of the image are represented by small dots and the shadows are represented by large dots. In other words, the size of the dots created in this manner vary according to the tones of the original image. The photographic film having the dot image thereon is then processed in a conventional manner and used to produce a printing plate which can then be used in an offset printing process.

More recently, halftone reproductions of images are produced electronically by using an exposing head having a number of light source elements arranged in a row, and by providing relative movement between the row of light sources and a light sensitive medium to be exposed, such as for example a photographic film. With such a system, the row of elements generates a line of light across the width of the light sensitive medium to be exposed, and the exposed area is then extended in a direction perpendicular to the line of light by relative movement between the medium and the line of light from the light source elements. The illumination of the light source elements during this relative movement is selectively controlled by electronic signals so that a series of halftone dots are created on the light sensitive medium. Typically, the electronic signals for controlling the illumination of the light source elements are made up of an electronically generated screen representing signal and a picture representing signal, the picture representing signal being common to all of the light source elements for the period in which each single dot is exposed. The screen representing signals are such as would be produced by scanning a vignetted contact screen at a resolution much finer than that used for picture scanning. In essence, with this technique, the continuous composition of the image to be reproduced is transformed to produce a plurality of dot character images on the light sensitive medium by building up each dot character from a line of light which is moved in a direction perpendicular to the direction of the line. The size of the dot character corresponds to the length of the line of light (and thus to the number of light source elements illuminated), and the length of time the light source elements are illuminated as the recording medium and light sources move relative to one another.

More particularly, in one typical type of system for electronic halftone image reproductions, the exposing head comprises six light source elements which may be selectively illuminated and which are arranged in a row to produce a line of light for exposing a light sensitive recording medium, such as for example a photographic film, which is placed on a cylindrical drum and adapted to rotate about an axis extending parallel to the row of light source elements. As the cylindrical drum is rotated, the light source elements are controlled so as to be illuminated intermittently to expose the light sensitive medium, the row of light source elements also being moved, such as for example by means of a lead screw arrangement, to traverse across the width of the light sensitive medium. Thus, the row of light source elements are moved along a line extending in a direction along the row, and the light sensitive medium is moved in a generally perpendicular direction therepast so that a series of helical sections are progressively exposed by the light source elements. By controlling the number of light source elements illuminated and the time of illumination during this relative movement, a series of halftone screen dots of varying sizes may be produced on the light sensitive medium. That is, each dot area is produced on the recording medium by illuminating one or more of the light source elements for a selected period of time, the width of the dot being determined by the number of light source elements illuminated and the length of the dot area being determined by the time the light source elements remain illuminated.

In many of these prior art systems for electronically producing halftone images, the light or radiation generated by each of the light source elements is substantially of the same intensity and the intensity is substantially constant during each interval. As such, the dot areas produced are what is normally termed "hard" or uniform density dots, i.e., dots produced with constant intensity radiation and having a small density gradient across the dot area. Generally, the intensity level of the radiation is much greater than that necessary to simply produce an image on the light sensitive medium.

U.S. Pat. No. 4,025,189 to Pugsley discloses a system in which "soft" or nonuniform density dots are produced, i.e., dots which are produced by radiation in which the intensity profile has sloping sides decreasing towards the edges. The dot areas produced in this manner have a density gradient across the dot area in which the density at the lateral edge of the dot area is lower than the density in the central portion of the dot area. As discussed in this reference, the reason or desirability behind producing such soft dots is to permit the length of the line of light generated by the light sources in the exposing head to be adjusted continuously so that a substantially continuous variation in dot size becomes possible.

More particularly, with typical electronically generated halftone image reproduction systems, the number of light source elements for producing the halftone dots on the medium is limited by the expense and complexity of the resulting optical system. Consequently, there is a practical limit on the number of gradations or steps of dot size obtainable with such systems. That is, when only six elements are utilized to produce a scanning line, with conventional systems in which the intensity profile of radiation produced by each light source is constant, the number of variations in size of the width of the dot elements created would be six, corresponding to the number of elements illuminated during the generation of the single dot area. In order to provide for greater variation in dot size without increasing the number of light source elements, Pugsley contemplated varying the illumination intensity of a light source element which is ajacent to an unilluminated light source element so that the rate of decrease of the light intensity with distance from the adjacent fully illuminated light source element could be adjusted. Thus, when there is a threshold of response in the reproduction process, such as when the recording medium to be exposed is a lithographic film having a response threshold, the progressive variation of illumination intensity of a light source element at the end of a segment of illuminated light source elements progressively adjusts the length of the line which will be printed at the portion of the required dot area. In other words, with the Pugsley arrangement, the length of the illuminated line of light which is directed onto the recording medium as the recording medium moves generally perpendicular past the light source elements may be adjusted continuously instead of incrementally, and thus the width of the dot being generated may be continuously varied. It should also be appreciated that with the Pugsley arrangement, the length or height of the dot created is still controlled by the length of time that the light source elements remain illuminated.

Another problem of the prior art arrangements for electrically generated halftone image reproductions relates to halftone image reproductions at different screen angles, such as for example with respect to color reproductions. As is well known in the art, color image reproductions are created by utilizing a number of different halftone image plates, each plate representing a dot image of a different color. To reproduce a color image, a printing operation, one for each different color, is performed with the halftone plates so that the halftone dots thereof are superimposed over or adjacent to one another. In such systems, each halftone image reproduction will have its dot centers arranged in rows and columns with the overall rows and columns being oriented at the different screen angles. For instance, typically, the halftone reproduction for one color is produced at a zero degree screen angle with the remaining reproductions being produced at different screen orientations, e.g., $+15°$, $+45°$ and $-15°$ for conventional four-color process reproductions.

As can be appreciated, it is desirable that the different halftone reproductions for different screen angles each be produced with the same apparatus, for example, the exposing head and rotary drum arrangement of the prior art systems described hereinabove. While such conventional arrangements in which the line of light source elements or signals are moved transversely across a screen which is being rotated or moved in a perpendicular direction relative to the line of signals may produce accurate and precisely controlled dot patterns for zero screen angles, the dot patterns produced for angled screen arrangements are not precise. This results from the fact that the exposed segments comprising each dot area actually are segmented bands having a width corresponding to the width of the light source elements which are illuminated for a certain period of time and a length or height corresponding to the time that the light source elements remain illuminated. This is the case whether zero angle reproductions are being generated or angled reproductions are being generated since the dot area is still being generated by moving the recording medium transversely to the row of light source elements and illuminating the light source elements for periods corresponding to the desired size of the dot to be produced. Thus, it will be appreciated that precisely controlled shapes for the dot areas can not practicably be produced with such prior art arrangements, and occasionally the reproductions are objectionable.

A still further problem with conventional electronically generated halftone reproductions relates to the ability to accomplish color corrections. Generally, color correction must be accomplished electronically by adjusting the picture representing signals generated by scanning of the original image. While equipment has been developed to accomplish this, acceptable correction of the color values have not always been produced and it is thus necessary to generate additional halftone reproductions having different color correction values.

Here, it should be noted that with the prior art systems in which the light image of an original is directed through a screen element, color correction may typically be accomplished by an etching process in which the size of the dot areas is adjusted after creation of the dot image. Such etching processes conventionally involve applying an etching solution to selected dot areas of the reproduction image which serve to alter the size of the selected dot areas, generally by reducing the size of the selected dot areas. To be able to utilize such an etching process, it is generally necessary that a significant photographic density gradient be provided across the dot area so that the etching solution will only attack the low density portions of the dot area. Such density gradients are inherently produced with halftone image reproductions created by directing a light image through a screen element. However, with electronically generated halftone reproductions, there generally is not a significant density gradient across the dot area; rather, only "hard" type dots are produced. Thus, it has not previously been possible to utilize an etching process for effective color correction with electronically generated halftone reproductions.

These and other disadvantages of the prior art arrangements are overcome with the method in accordance with the present invention.

SUMMARY OF THE INVENTION

In accordance with the present invention, there is provided a method for producing a desired image on a radiation sensitive recording medium which comprises providing radiation means operable to produce radiation at a predetermined location from the radiation means. A radiation sensitive recording medium and the radiation means are mounted to provide relative movement therebetween so that respective portions of the recording medium are presented at the predetermined location from the radiation means. The radiation means is operated as the radiation means and the recording means move relative to one another so as to expose the recording medium with radiation in a pattern of dot areas to produce an image, at least one of the dot areas including at least one subdot area having a density which is below a predetermined value. Thereafter, at least one portion of at least one subdot area is manipulated so as to modify the size of the exposed dot area to thereby produce the desired image. Preferably, the step of manipulating comprises etching the lower density portion of the dot area to thereby reduce the size of the dot area on the film. The lower density portions of the dot areas may conveniently be produced on the film with radiation of an intensity level below a predetermined value. When the intensity level of the radiation for creating the portions of the dot areas other than the lower density portions is higher than the predetermined value, "soft" dot areas will be created on the film which may be easily etched utilizing conventional techniques.

This ability to modify the size of the dot areas is most important in providing the capability of correction of the halftone images which are reproduced to thereby provide a desired composition for the reproduced image. Such modification and correction by manipulating the size of the dot area after it has been produced is not possible where hard dot areas have been previously produced on the recording medium, such as for example might be produced with a light source having a high constant intensity.

These and further features and characteristics of the present invention will be apparent from the following detailed description in which reference is made to the enclosed drawings which illustrate a preferred embodiment of the present invention.

BRIEF DESCRIPTION OF THE DRAWINGS

FIG. 1 is a schematic illustration of the apparatus which may be used in accordance with the present invention for producing images on a radiation sensitive recording medium.

FIG. 2 is a schematic illustration of the exposing means of the apparatus shown in FIG. 1.

FIGS. 3a-3n are greatly enlarged representations of different dot area patterns comprised of different numbers of subdot areas which may be produced in accordance with the present invention, and illustrating collectively the progression of dot area patterns as the number of subdot areas increases.

FIGS. 4a, 4b and 4c are schematic illustrations of various possible relationships between the number of subdot areas to be produced and the voltage signals provided by the scanning equipment.

FIG. 5 is a still further enlarged representation of the dot areas shown in FIG. 3d, illustrating a portion of the spiral progression or sequence of subdot areas as the number of subdot areas increase.

FIGS. 10a, 10b, 10c and 10d are schematic illustrations of typical dot center patterns which may be produced in accordance with the method of the present invention.

FIG. 11 is a schematic illustration of a matrix of radiation signals together with various types of dot area patterns which may be produced therewith.

FIG. 12 is a schematic illustration of a similar matrix of radiation signals angularly inclined with respect to the direction of relative movement between the radiation means and the radiation sensitive recording medium, together with various types of dot patterns which may be produced therewith.

DETAILED DESCRIPTION OF THE PREFERRED EMBODIMENT

Figure 6A:
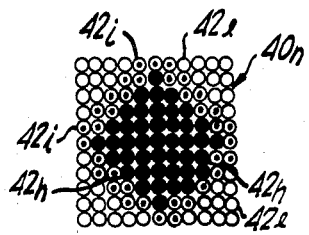
FIGS. 6a, 6b and 6c are greatly enlarged representations of different dot area patterns which may be produced in accordance with the present invention, illustrating typical density gradients within the dot areas.

Referring now to the drawings wherein like reference characters represent like elements, there is shown in FIG. 1 a schematic illustration of the apparatus 10 in accordance with the present invention for producing images on a radiation sensitive recording medium 12. The apparatus 10 is particularly useful for producing halftone images of an original continuous tone image and thus will be described with reference to such a use.

However, it should be appreciated that the apparatus 10 could also be used to generate alphanumeric characters or symbols, or other types of images, on the radiation sensitive medium 12, and thus the particular use described hereinbelow should not be taken as limiting the scope of the present invention.

In the preferred embodiment, the apparatus 10 is designed to be associated with conventional scanning equipment (represented by the reference character 14) which produces electronic scanning signals 16 which are representative of the photographic density of the image being scanned. The apparatus 10 is responsive to the electronic scanning signals so as to produce radiation signals for exposing the radiation sensitive medium 12 to thereby produce a halftone image of an original image or picture. Typically, the electronic scanning signals 16 are produced by scanning an image with an analysis device in a series of parallel lines to produce a series of output analog voltage signals which represent the photographic density values of the element of the image being scanned. Generally, the electronic scanning signals 16 comprise continuously varying analog voltage signals, the voltage at any particular instant being proportional to the photographic density of the portion of the image being scanned at the particular instant. If a full color image is scanned, the analysis device will produce a series of color output scanning signals which represent the different color component values of the image being scanned. Generally, filters are employed in the analysis device, such as for example red, green and blue filters and in a conventional four-color process reproduction, the signals produced represent the cyan, magenta and yellow printer channels. These electronic scanning signals for the different colors may be applied to a color correction or computation unit in which corrections are introduced in a well known manner.

Also, as is conventional, some or all of the signals 16 produced by the scanning equipment or analysis device may be stored and then extracted at a later time for combination with screen component or timing signals. This is particularly useful with respect to halftone images for reproduction of color images in which several different halftone images, one for each color, are produced for the color image being scanned.

The equipment 14 for producing the electronic scanning signals 16 forms no part of the present invention. Likewise, the use of the produced halftone image reproductions in conventional manners for printing of full color image reproductions forms no part of the present invention, although it is to be noted that the halftone images which are produced in accordance with the present invention have particular application to the production of improved full color image reproductions.

As is conventional, in order to produce a halftone image, screen component or timing signals may be applied to the electronic scanning signals 16 to produce resultant signals which are then used to control the apparatus 10 to produce a desired halftone image on the radiation sensitive recording medium 12. The screen component or timing signals are representative of the type or dot size of halftone screen to be created, and typically are representative of scanning a vignetted contact screen at an equal or finer resolution than that used for picture or image scanning. In accordance with the present invention, and as discussed more fully hereinbelow, the screen component or timing signals in essence represent the timing intervals for activation of the apparatus 10 for exposing the recording medium 12 in a series of dot areas to produce a halftone image of the original image being scanned.

In accordance with the present invention, the electronic scanning signals 16 are applied to radiation source control means 18 which combines the screen component or timing signals therewith to generate the resultant signals for controlling an exposing means 20 to selectively generate light or radiation signals for exposing the radiation sensitive recording medium 12 in the desired pattern as the exposing means 20 and recording medium 12 move relative to one another. If desired, the radiation source control means 18 may serve to generate the screen component or timing signals, or the screen component signals could be generated by other means and applied to the radiation source control means 18. It should of course be appreciated that the screen component or timing signals need not be applied directly to the produced scanning signals 16, but instead could be applied after modification or processing of the electronic scanning signals 16 into a form more suitable for use by the radiation source control means 18, e.g., after amplification, shifting, etc. of the produced electronic scanning signals 16.

The radiation sensitive recording medium 12 may comprise a light sensitive lithographic film 12 which, as shown in FIG. 1, is mounted onto a cylinder 22 which is arranged in opposing relationship to the exposing means 20 which includes an exposing head 24 mounted on a lead screw 26. Relative motion between the light sensitive recording medium 12 and the exposing head 24 is achieved by rotating the cylinder 22 about its axis and by rotating the lead screw 26 to cause the exposing head 24 to move along the lead screw 26 in a direction parallel to the axis of the cylinder 22. The rotation of the lead screw 26 is slow in relation to the rotation of the cylinder 22 so that the exposing means 20 is adapted to expose the light sensitive medium or film 12 on the cylinder 22 in a succession of axially spaced circumferential lines, each line in turn being comprised of a series of closely spaced dots.

Of course, it will be appreciated that other types of mechanisms for providing relative motion between the exposing means 20 and the light sensitive film 12 could be utilized. For example, the film 12 could be placed on a flat bed which is moved or reciprocated back and forth along a first direction, and the exposing means 20 could be mounted to move in a direction perpendicular thereto so that the exposing means 20 is indexed in increments each time that the film 12 is moved or reciprocated therepast. In essence, with such a flat bed relative motion apparatus, the light sensitive film 12 would be exposed in a series of closely spaced lines, each of which in turn would comprise a series of closely spaced dots.

Referring to FIG. 2, in accordance with the present invention, the exposing means 20 is operative to selectively generate a plurality of separate, individual radiation or light signals 30 which are arranged to define a matrix 32 of light signals 30 having m rows and n columns in which m and n are integers each greater than one. The matrix 32 of light signals 30 is of a predetermined cross sectional size at a predetermined location relative to the exposing means. Preferably, the overall cross sectional size of the matrix 32 of light signals 30 corresponds to the maximum desired size of a dot area to be produced on the light sensitive recording medium 12.

The light sensitive recording medium 12 and the exposing means 20 are mounted to provide for relative movement therebetween so that respective portions of the recording means are presented at the predetermined location from the exposing means 20. The exposing means 20 is controlled by the radiation source control means 18 so as to selectively generate, at selected intervals, one or more of the light signals 30 as the exposing means 20 and recording medium 12 move relative to one another to thereby expose or produce a series of dot areas 40 on the recording medium 12 (see for example, FIGS. 3a–3n which show representative dot area patterns 40 which can be produced with an exposing means which can generate a matrix of light signals having 11 rows and 11 columns). Each of the exposed dot areas 40 on the film 12 is produced during one of the selected intervals and comprises one or more exposed subdot areas 42 corresponding in number to the number of light signals 30 selectively produced during the one interval for producing such dot area 40. In this manner, the size of the exposed dot area 40 is less than or equal to the predetermined size, and corresponds to the size at the predetermined location of the light signal or signals 30 selectively produced during the one interval. Simply stated, the apparatus 10 in accordance with the present invention provides for selective generation of one or more of a plurality of radiation or light signals 30 at each dot area location such that the dot area 40 produced will actually be composed of one or more subdot areas 42.

More particularly, in accordance with the preferred embodiment of the present invention, a plurality of individual light sources 50 are provided which may be selectively illuminated by the radiation source control means 18. The light beams or signals emitted by each of the individual light sources 50 are brought together to define a plurality of light beams or signals 54, such as through the use of fiber optic conductor elements 56. The plurality of light beams or signals 54 are arranged such that if all of the light sources 50 are illuminated, the light beams would define a matrix 52 of light beams or signals 54. The light beams 54 are then directed and focused by suitable means 58, 60 to define the light signals 30 to be directed onto the light sensitive film 12, the arrangement of light signals 30 being the same as the arrangement of the light beams 54 before focusing. In other words, if all of the light sources 50 are illuminated, then a matrix 32 of light signals 30 would be produced and directed onto the film 12, the number of columns and rows in the matrix 32 being the same as the number of columns and rows in the matrix 52. The directing and focusing by the means 58, 60 is such that the overall size of the matrix 32 of light signals 30 at the location of the film 12 corresponds to the maximum desired size of the individual dot areas 40 to be produced.

Thus, the size and pattern of each dot area 40 exposed on the film 12 will be dependent on the number of light sources 50 illuminated and on which light sources 50 are illuminated. That is, the size and pattern of the largest size dot area 40 which may be produced on the film 12 will correspond to the size and configuration of the matrix 32 of light signals 30 at the location of the film 12, whereas other, smaller size dot areas 40 which may be produced will correspond (i) in size to the size of the signals 30 at the location of the film 12 generated by the light sources 50 which are selectively illuminated and (ii) in configuration to the shape and configuration of such signals 30 in the matrix 32.

In this regard, for a typical halftone image reproduction which comprises approximately 22,500 dot areas per square inch, the pitch or distance between dot centers is equal to 1/150 of a inch or 0.0067 inches. Thus, in accordance with the present invention, the size of the matrix 32 of light signals 30 at the location of the photographic film 12 for such a typical halftone reproduction would be 0.0067 inches by 0.0067 inches, or approximately 0.00004444 square inches. This would correspond to the maximum overall size of the dot area 40 to be produced on the film 12. Accordingly, it will be appreciated that each individual light signal 30 at the location of the film 12 must necessarily be of a smaller size so as to be capable of exposing a smaller subdot area 42. In other words, each of the subdot areas 42 to be produced on the film 12 must be of a smaller size than the overall maximum dot area size to be produced on the film 12, i.e., smaller than 0.0067 inches by 0.0067 inches in the example above. In this regard, subdot sizes as small as 0.00025 inches in diameter can be produced utilizing known fiber optic techniques and demagnification lenses.

In the preferred embodiment of the present invention, the plurality of individual light sources 50 comprise a plurality of light emitting diodes 50 which are suitably supported on a lamp assembly support structure 62, such as for example a printed circuit board, as schematically illustrated in FIG. 2. A fiber optic element or conductor 56 is suitably coupled at one end to the light output window of each light emitting diode 50. The other ends 63 of the fiber optic conductors 56 are brought together and arranged to define a matrix 64 of fiber optic ends having m rows and n columns. This may be accomplished by cementing, clamping or otherwise maintaining the ends 63 of the fiber optic elements 56 together to define an array arranged in a matrix 64 having m rows and n columns. The end of the matrix array may then be cut and polished in a known manner so that the light emitted from the matrix 64 is normal to the end surface of the matrix 64.

When the light emitting diodes 50 are illuminated, the light emitted thereby will thus be coupled through the floor optic conductors 56 and emerge from the matrix 64 as an array of light beams 54, the number and pattern of light beams 54 being dependent on which light emitting diodes 50 are illuminated. If all of the diodes 50 are illuminated, a matrix 52 of beams 54 will emerge from the matrix 64 of fiber optic conductors 56. The light beams 54 are directed, such as through the use of a mirror 58, through a demagnification or objective lens 60 which serves to reduce the overall size or cross sectional area of the array of light beams 54 even further at the focal point or focus of the lens 60. At the focal point or focus of the lens 60, there will be provided the same number and pattern of light signals 30 as emerged from the matrix 64 of the fiber optic conductors 56, but the size of the individual light signals 30 will be smaller than the size of the beams 54, and the overall cross sectional area of the array of signals 30 will be smaller than the overall cross sectional area of the array of light beams 54 at the matrix 64 of fiber optic conductors 56. For example, if all of the light emitting diodes 50 were illuminated, the array of light signals 30 produced at the focal point or focus of the lens 60 would comprise a matrix 32 of light signals 30 having m rows and n columns.

In the embodiment shown in FIG. 2, twenty-five lamps or light emitting diodes 50 are supported on the support structure 62, and the fiber optic elements 56 have their ends 63 brought together to define a matrix 64 having five rows and five columns. Such an arrangement will thus be capable of producing twenty-five light beams 54 which are directed in a square matrix 52 through the objective lens 60 to focus the signals 30 at the focal point of the lens 60. That is, at the focal point of the lens 60, the matrix 32 of light signals 30 will likewise have five columns and five rows, and the size will be reduced from the size at the matrix 64 of fiber optic conductors 56. The number of light emitting diodes 50 and the arrangement of the ends 63 of the fiber optic conductors 56 may be of any desired cross-section, number and arrangement.

When the lithographic film 12 is arranged at the focus or focal point of the objective lens 60, and all of the light emitting diodes 50 are illuminated, the film 12 will be exposed to produce a dot area or image 40 thereon which is comprised of a plurality of subdot areas 42 arranged in a matrix having a corresponding number of rows and columns as the number of rows and columns of the matrix 64 of the fiber optic conductors 56. For instance, in the embodiment shown in FIG. 2, the dot area 40 created on the film 12 would have a plurality of closely spaced subdot areas 42 which define a matrix having five rows and five columns. The width and height of the matrix exposed on the film 12 should preferably correspond to and be no greater than the overall screen spacing for the desired halftone image reproductions. Thus, for a screen spacing of 150 lines or dots per inch, the width and height of the produced dot area 40 should each be approximately 0.0067 inches.

By illuminating only selected light emitting diodes 50, different dot area 40 patterns, each comprised of one or more subdot areas 42, may be produced in which the size and pattern of the dot area 40 corresponds to the number of light emitting diodes 50 illuminated and the arrangement of the ends 63 of the fiber optic conductors 56 in the overall matrix 64 coupled to the illuminated light emitting diodes 50.

More particularly, FIGS. 3a-3n show greatly enlarged representations of some typical dot areas 40 which may be produced on a film 12 which is arranged at the focal point of the demagnification lens 60 with an exposing head 24 having 121 light emitting diodes 50 which are coupled to fiber optic conductors 56 arranged to have their ends 63 define an 11 by 11 matrix. The patterns of dot areas 40, beginning with FIG. 3a, progressively increase in size as the number of subdot areas 42 exposed on the film 12 progressively increases. For instance, FIG. 3a shows a dot area 40a comprised of five subdot areas 42 which may be produced by illuminating the five light emitting diodes 50 which are coupled to the central five fiber optic conductor ends 63 in the matrix 64, whereas FIG. 3b shows a dot area 40b comprised of thirteen subdot areas 42 which may be produced by illuminating the thirteen light emitting diodes 50 which are coupled to the fiber optic conductor ends 63 of the matrix 64 which are located in the same position of the matrix 64 as the position of the subdot areas 42 shown in FIG. 3b. Progressively greater size dot areas 40, each comprised of a progressively greater number of subdot areas 42, are illustrated in the remaining FIGS. 3c-3n. When all of the 121 light emitting diodes 50 are illuminated, a dot area 40n will be exposed on the film 12 which comprises a matrix 70 of subdot areas 42 arranged in 11 rows and 11 columns, as best seen in FIG. 3n.

Assuming that the dot area 40n of FIG. 3n comprises a 100% dot area, i.e., a completely exposed dot area 40n, it will be appreciated that smaller size dot areas 40a, 40b, 40c, etc., may be produced by exposing a lesser number of subdot areas 42 on the film 12, and the size of the produced dot areas 40a, 40b, 40c, etc., may be represented as a percentage of the maximum possible size corresponding to the dot area 40n illustrated in FIG. 3n. For example, the dot area 40a illustrated in FIG. 3a occupies approximately 4.1% of the maximum possible dot area size which could be produced on the film 12 (i.e., 5/121×100%), whereas FIG. 3b illustrates a dot area 40b occupying approximately 10.7% of the maximum possible dot area size (i.e., 13/121×100%). Also, it will be appreciated that each of the patterns of dot areas 40 shown in FIGS. 3a-3n are centrally arranged about the center of the dot area 40 and represent substantially symmetrical dot area patterns. For example, the five subdot areas 42 shown in FIG. 3a are arranged in a diamond shaped pattern, whereas the twenty-one subdot areas 42 illustrated in FIG. 3c are arranged in a generally circular pattern, and the 121 subdot areas 42 of the fully exposed dot area 40n shown in FIG. 3n are arranged in a substantially square pattern. Also, it should be appreciated that other dot area sizes intermediate to the sizes shown in the progression of FIGS. 3a-3n may be provided by simply increasing or decreasing the number of subdot areas 42 produced on the film 12 from those shown in FIGS. 3a-3n. The total number of different size dot areas 40 which can be produced corresponds to the maximum number of subdot areas 42 which may be produced, i.e., 121 in the example shown with reference to FIGS. 3a-3n.

The following chart presents a summary of the number of subdot areas 42, the percentages of the maximum possible dot area size, and the nature of the symmetrical pattern produced for several typical dot areas 40 which may be produced with a matrix 64 which has 11 rows and 11 columns.

| Number of Subdot Areas | Percentage of Maximum Possible Dot Area Size | Nature of Dot Area Pattern |
|---|---|---|
| 1 | .8 | Circle |
| 5 | 4.1 | Diamond |
| 9 | 7.4 | Square |
| 13 | 10.7 | Diamond |
| 21 | 17.4 | Circle |
| 25 | 20.7 | Diamond |
| 29 | 24.0 | Circle |
| 37 | 30.6 | Circle |
| 41 | 33.9 | Diamond |
| 49 | 40.5 | Circle |
| 57 | 47.1 | Circle |
| 61 | 50.4 | Diamond |
| 65 | 53.7 | Circle |
| 73 | 60.3 | Circle |
| 81 | 66.9 | Diamond |
| 89 | 73.6 | Circle |
| 97 | 80.2 | Diamond |
| 101 | 83.5 | Circle |
| 109 | 90.1 | Diamond |
| 117 | 96.7 | Diamond |
| 121 | 100.0 | Square |

Although the size of the dot areas 40 may be chosen as desired, it will be recalled that the spacing between the centers of the dot areas 40 will correspond to the desired halftone screen to be produced. For instance, if a 150 dot per inch halftone screen is to be produced, a width and length of the square matrix 70 produced by illuminating 121 light emitting diodes 50 would be approximately equal to 0.0067 inches on each side at the location of the film 12. This corresponds to a 100% dot area. Accordingly, it will be appreciated that for dot areas 40 having a size which is less than this 100% dot area, the size of the dot area 40 will be proportional to the number of subdot areas 42 produced in relation to 121.

It will be noted that in FIGS. 3a-3n that certain of the circles representing the subdot areas 42 are completely darkened or filled in, whereas other of the circles are not darkened or filled in. This representation is to provide an indication of which subdot areas 42 have been added to the dot area pattern shown in the preceding figure. For instance, in FIG. 3a, only the central circle is blackened, whereas the four surrounding circles are not blackened or filled in. Thus, if a dot area comprised of one subdot area 40 is to be produced, the one subdot area 42 would occupy the central position of the dot area (i.e., the position of central, blackened circle shown in FIG. 3a). If a dot area comprised of two subdot areas 42 is to be produced, the two subdot areas 42 would occupy the central position and the position of one of the four surrounding nonblackened circles shown in FIG. 3a. Similarly, if a dot area comprised of five subdot dot areas 42 is to be produced, the five subdot areas would occupy the central position and the positions of the four nonblackened circles shown in FIG. 3a. To produce a dot area comprised of six subdot areas 42, the six subdot areas would occupy the positions of the central five circles shown as completely blackened in FIG. 3b (and corresponding to the five circles shown in FIG. 3a) and the position of one of the next eight surrounding nonblackened circles shown in FIG. 3b, e.g. the subdot area 42$_6$. For a dot area comprised of seven subdot areas 42, the subdot areas 42 would occupy the position of the five blackened circles and two of the eight nonblackened circles in FIG. 3b, e.g. 42$_6$ and 42$_7$. Similarly, for dot areas comprised of 8-13 subdot areas 42, the subdot areas 42 would occupy the position of the five blackened circles and an appropriate number (i.e., 3-8) of the nonblackened circles in FIG. 3b. In a like manner, for a dot area comprised of 14-21 subdot areas 42, the subdot areas 42 would occupy the positions of the 13 blackened circles shown in FIG. 3c and 1-8 of the nonblackened circles shown in FIG. 3c, and so on for dot areas of progressively larger size.

Thus, it will be appreciated that FIGS. 3a-3n illustrate the progression of how subdot areas 42 are added to produce dot areas 42 of increasing size. Here, it should be noted that in accordance with the preferred embodiment of the present invention, the subdot areas 42 of a particular dot area are all preferably exposed on the film 12 during the same interval by selectively illuminating the appropriate light emitting diodes 50 as the film 12 and the exposing head 24 move relative to one another. Accordingly, it will be appreciated that the subdot areas 42 of larger sized dot areas 40 are not produced by a series of exposures at different time intervals (i.e., not by first exposing a first grouping of subdot areas and then subsequently exposing different subdot areas of the same dot area), but rather, when a larger size dot area 40 is to be produced, the appropriate light emitting diodes 50 are all selectively illuminated during the same time interval. However, in certain instances in accordance with the broad principles of the present invention, portions of a dot area 40 may be selectively illuminated during different time intervals, if desired, such as described hereinbelow with reference to FIG. 12.

The particular dot area shapes or configurations shown in FIGS. 3a-3n generally correspond to typical dot shapes and configurations which are generally desirable and which have been produced hereinbefore with conventional prior art screens, and thus are the generally preferred patterns to be produced for different sized dot areas 40. However, it should also be appreciated that different patterns of dot areas could be produced if desired, such as for example, completely square patterns or elliptical patterns.

The particular type of dot area 40 progressions illustrated in FIGS. 3a-3n are also advantageous from the standpoint of simplicity in the electrical circuitry for the radiation source control means 18 to control appropriate selective generation of the light emitting diodes 50 to produce desired dot areas 40 on the film 12. Specifically, in accordance with the preferred embodiment of the present invention, radiation source control means 18 utilizes the scanning signal 16 (which typically comprises a continuous analog voltage signal) generated by the scanning equipment 14 to determine not only the number of light emitting diodes 50 to be illuminated but also the pattern or configuration as well since there can be a unique one-to-one correspondence of dot area 40 pattern or configuration to the number of light emitting diodes 50 to be illuminated.

More particularly, the analog voltage signal 16 received from the scanning equipment 14 is converted to a digital signal by the control unit 78 which automatically determines the number of light emitting diodes 50 to be illuminated for exposing the film 12 at a particular interval. This may be accomplished by scaling the analog voltage signals 16 from the scanning equipment, such as by amplifying and shifting same, to provide a modified voltage signal which is between predetermined voltages, such as for example, zero to three volts. As the voltage signal 16 from the scanning equipment corresponds to the photographic density of the scanned image, it will be appreciated that there can be a functional relationship between the modified voltage signal and the size of the dot area 40 to be produced. Since the size of the dot area 40 can correspond to the number of subdot areas 42 to be produced, there can be a functional relationship between the voltage signal 16 produced by the scanning equipment and the number of light emitting diodes 50 to be illuminated. This is illustrated schematically in FIGS. 4a, 4b and 4c which show various functional relationships which can be provided.

More particularly, FIG. 4a shows a linear relationship between the number of subdot areas 42 to be produced and the voltage from the scanning equipment 14 in which a zero voltage from the scanning equipment 14, which represents a clear portion on the image being scanned, corresponds to zero light emitting diodes 50 to be illuminated, and thus will produce a dot area 40 which is also clear (i.e., one in which no subdot areas 42 are produced), and in which a three volt signal, which represents a 100% density or opaque region of the image being scanned, corresponds to the maximum number of light emitting diodes 50 to be illuminated and thus will produce a fully exposed dot area 40 comprised of the maximum number of subdot areas 42. In connection with the dot area 40 patterns shown in FIGS.

3a-3n, in which the maximum number of subdot areas 40 which may be exposed to occupy a single dot area 40n comprises 121, the three volt signal would thus correspond to 121 subdot areas 42 or 121 light emitting diodes 50 to be illuminated to expose the film 12. Likewise, a zero volt signal would correspond to no subdot areas 42 or zero light emitting diodes 50 to be illuminated. Similarly, in FIG. 4a a 1.5 volt signal would correspond to 61 subdot areas 42 or approximately one-half of the maximum number of subdot areas 42 to be produced. FIG. 4b shows a nonlinear functional relationship between the number of subdot areas 42 to be produced (and thus the number of light emitting diodes 50 to be illuminated) and the voltage produced by the scanning equipment 14. In this instance, the abscissa is represented as a percentage of the voltage from the scanning equipment 14. The particular nonlinear relationship between the number of subdot areas 42 to be produced and the voltage from the scanning equipment 14 is one in which the number of subdot areas 42 to be produced for a 50% voltage from the scanning equipment 14 is 50, or approximately 41% of the maximum number of subdot areas which could be produced. FIG. 4c shows a still further example of a functional relationship between the number of subdot areas 42 and the voltage from the scanning equipment 14 which can be employed. In this example, the functional relationship is linear, but offset slightly so that at the lowest voltage from the scanning equipment 14 (i.e., 1.0 volts in FIG. 4c) 21 subdot areas 42 would be produced, whereas at the maximum voltage from the scanning equipment 14, the number of subdot areas 42 would be 121.

Of course, the particular functional relationship shown in FIGS. 4a, 4b and 4c are only illustrative of typical relationships which could be employed, and it should be understood that other types of functional relationships could be employed if desired. Also, it should be appreciated that if a negative of the image being scanned is to be produced, the voltage signal 16 could be inverted and shifted so that the clear area on the image being scanned would correspond to a three volt signal and a 100% density or opaque region would correspond to a zero volt signal.

Thus, in accordance with the present invention, the continuous analog voltage signal 16 produced by the scanning equipment is converted into a digital signal which represents the number of light emitting diodes 50 which are to be illuminated to produce a corresponding dot area 40 on the lithographic film 12. Since there can be a one to one relationship between the number of light emitting diodes 50 to be illuminated and the particular desired dot area 40 configuration to be produced, the digital signal representing the number of light emitting diodes 50 to be illuminated (and thus the number of subdot areas 42 to be produced on the film 12), may be utilized to determine the pattern or configuration of the subdot area 42 to produce the desired dot area 40, for instance, the particular one to one configurations illustrated in FIGS. 3a-3n. More particularly, if the digital signal corresponding to the scanned voltage signal 16 determines that the dot area is to be comprised of five subdot areas 42, the pattern of subdot areas 42 would correspond to that shown in FIG. 3a. Similarly, if the dot area 40 is to be comprised of thirteen subdot areas, the pattern would correspond to that shown in FIG. 3b, and so on.

As was noted hereinabove, with reference to FIGS. 3a-3n, as the number of subdot areas 42 comprising a particular dot area 40 increases, the additional subdot areas 42 are provided about the periphery of the prior pattern and naturally progress in a sequence which in essence spirals about the center of the dot area 40. This feature may be advantageously utilized by the radiation source control means 18 in connection with the determination of the pattern of dot areas 40 once the number of subdot areas 42 is determined. Instead of identifying the particular light emitting diodes 50 to be illuminated by row and column of the matrix 64, the light emitting diodes 50 may be prearranged or ordered in a sequence so that as the size of the dot area 40 increases by one additional subdot area 42, the subdot area 42 to be added will be the subdot area 42 which will be produced by the next light emitting diode 50 in the sequence in order.

More particularly, with the spiral type of progression illustrated in FIGS. 3a-3n, each of the subdot areas 42 may be numbered or identified as being located within a spiral pattern beginning with the centralmost subdot area 42. For instance, the subdot area 42 located at the center of the dot area 40a may be identified by the number 1, the second subdot area 42 located adjacent thereto and along one side thereof as number 2, the third or number 3 subdot area 42 being the subdot area 42 located next to the central number 1 subdot area 42 and progressing in a counterclockwise direction relative to the number 2 subdot area 42, etc., so that the progressively higher numbered subdot areas 42 are located and spiral outwardly about the number 1 subdot area 42. A portion of this spiral sequence for the subdot areas 42 is illustrated in FIG. 5, the identification number for each subdot area 42 being placed within the circle representing the subdot area 42. Thus, it will be appreciated that the particular desired pattern for each of the 121 different dot areas 40 in the example discussed hereinabove can simply be generated by appropriate signals which identify the light emitting diodes 50 which are to be selectively illuminated by virtue of their location in the generally spiral progression illustrated schematically in FIGS. 3a-3n.

Accordingly, it will be appreciated that different size dot areas 40 comprised of one or more subdot areas 42, and the different patterns thereof, can be produced by simply selectively operating selected ones of the light emitting diodes 50 supported on the circuit board support structure 62. The particular dot area 40 and pattern which will be reproduced corresponds to illuminating only those light emitting diodes 50 whose fiber optic conductors 56 occupy the desired locations in the matrix 64 which corresponds to the desired dot pattern 40. This particular size of the dot area 40 and pattern in turn is determined by the scaled value of the scanning signal 16 from the scanning equipment 14 in the manner described hereinabove. That is, the electronic scanning signal 16 from the scanning equipment 14 determines not only the number of light emitting diodes 50 to be illuminated but also the particular light emitting diodes 50 to produce the desired dot area 40.

Further, it will be appreciated that in accordance with the present invention, a complete dot area 40, or a particular portion thereof, may be exposed at substantially one time interval simply by selectively controlling which light emitting diodes 50 are actuated during the time interval. This is in contrast to prior art techniques for electronically producing halftone screens in which a dot area is developed on a film according to one or more passes or sweeps of a row of light sources, the number of light sources in the row which are illuminated during the sweeps, the timing of the start of illumination of each light source in the row and the period each light source in the row remains illuminated. This capability in accordance with the present invention of producing a dot area 40 by controlling which (i.e., by the number and location) light emitting diodes 50 are illuminated is most important as it produces better dot to dot registration and dot resolution, and can accomplish same in a shorter period of time. Furthermore, this particular capability is most important in connection with producing angled screen halftone dot reproductions, as discussed more fully hereinbelow. Also, as a consequence of producing an entire dot area 40 at one time, sharper subdot area to subdot area registration (within one dot area 40) will be provided since the perimeter of the dot area 40 is more precisely controlled.

In terms of making halftone image reproductions of an original continuous tone image in which a series of dot areas 40 are produced on a radiation sensitive recording medium 12, the apparatus 10 as shown schematically in FIGS. 1 and 2 is operative to expose a series of dot areas 40 onto the radiation sensitive medium or film 12 by selectively illuminating the individual light emitting diodes 50 at selected intervals as the film 12 and the exposing head 24 are moved relative to one another. In particular, as the cylinder 22 having the film 12 thereon is rotated, the individual light emitting diodes 50 will be selectively illuminated, i.e., turned on and off, at selected intervals, thereby producing a series of closely spaced circumferential rows of dot areas 40 on the film 12, each dot area 40 and each row being closely spaced with respect to the adjacent dot areas 40 so that an overall halftone image of an original image will be reproduced on the film 12. Each dot area 40 so produced on the film 12 will comprise one or more closely arranged subdot areas 42, each of which is produced according to the number and pattern of light emitting diodes 50 which are selectively actuated to produce the one dot area 40 during the interval for producing such dot area 40. That is, as the film 12 and the exposing head 24 move relative to one another, the portions of the film 12 corresponding to the desired dot area centers are progressively brought into alignment with the focus or focal point of the demagnification lens 60 in the exposing head 24. As the portion of the film 12 corresponding to each desired dot center is aligned with the exposing head 24, the light emitting diodes 50 are selectively illuminated to thereby expose a dot area 40 of a desired size and pattern on the film 12 at the desired dot center location, the number and pattern of light emitting diodes 50 illuminated corresponding to the electronic scanning signal 16 generated by the scanning equipment 14 and thus the desired pattern of the dot area 40 to be produced.

Another feature in accordance with the apparatus 10 of the present invention is the capability of producing dot areas 40 whose size may be manipulated after exposure on the film 12, i.e., the size of the individual dot areas 40 may be modified after they have been produced on the recording medium 12. This manipulation is accomplished by what is generally termed etching. Dot etching is mostly utilized for correction and generally consists of reducing the dot size on a halftone reproduction to provide a desired printing value when prints are made with the halftone reproduction. It should also be noted however, that when it is desired to increase the size of the dot area 40, same may be accomplished by utilizing a halftone positive made from the halftone negative which produces a reversed halftone print.

Typically, conventional etching processes involve the careful application of a chemical etching solution to exact areas on an exposed film 12 for a specified period of time to etch away portions of the dot area 40. After the desired amount of etching has been accomplished, the etching solution is simply removed from the film 12 and further etching ceases. As is well known, to permit any etching whatsoever, there must be a density gradient across the dot area 40, i.e., a density gradient from the core or central portion of the dot area 40 toward the margin of the dot area 40. Such dots are commonly known as "soft" dots and generally have a lower density at the peripheral edges of the dot area 40 than at the central core.

Here, it should be noted that the general manner of producing such soft dots for etching in the past has been exposing a film through a screen element which serves to slightly diffuse the light passing therethrough to provide lower density fringes around the created dot areas. With conventional electronically generated dot patterns, however, the dots typically are hard and have a very small density gradient across the dot area. Consequently, with conventional electronic dot generation half-tones, the dot areas thereon are not as responsive to conventional etching processes. The reason for this is the fact that the etching solution generally attacks the lower density areas or portions of the dot area initially, thus shrinking the dot area to a desired degree. If such etching processes were performed in connection with hard dots, no precisely controlled amount of etching or reduction in size would be produced because the hard dots have a very small density gradient across the dot area; rather, the density of the central core portion of the dot would be destroyed with no significant reduction in the peripheral margin of the dot area.

As is known, the photographic density of a dot element on finished film is affected by the exposure time of the illuminating means, light intensity during exposure, focus, optics, magnification, film, film developing processing and the velocity between the illuminating means and the photographic film. Thus, assuming that the focus, optics, magnification and film selection are fixed in a particular system configuration, the exposure time and light intensity during exposure can be used to control the photographic density of the dot element on the finished film. Here, it should also be noted that it is known that this control can be used to compensate for film processing variations and variations within specific limits of film velocity or relative movement between the illuminating means and the film.

In accordance with the present invention, the photographic density of each of the subdot areas 42 produced on the finished film 12 can be precisely controlled to produce desired density gradients within and across the dot area 40 so as to permit conventional photographic etching of the dot area 40 to manipulate the size of the finished dot area 40 on the film 12. Specifically, with the present invention in which a matrix of light beams or signals 30 is utilized for producing dot areas 40 comprised of one or more subdot areas 42 on the film 12, it is practical to generate photographic density gradients within and across the dot area 40 by simply controlling the exposure time or light intensity during exposure of the light sources 50 producing the various subdot areas 42, or a combination of both.

Figure 6B:
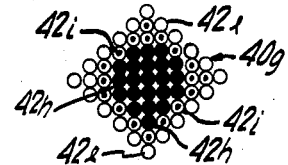
Figure 6C:
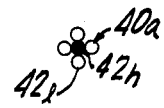

More particularly, FIGS. 6a, 6b and 6c of the drawings illustrate several different examples of dot areas 40 in which some of the subdot areas 42 have a different photographic density from the other subdot areas 42 thereof, thereby producing a density gradient across the dot area 40. In these figures, the subdot areas $42_h$ represented by a completely blackened circle correspond to subdot areas having a high photographic density, the subdot areas $42_i$ represented by a circle having a dot therein correspond to subdot areas having an intermediate photographic density, and the subdot areas $42_l$ represented by a non-blackened or filled in circle correspond to subdot areas having a low photographic density. Thus, in FIG. 6a which illustrates a 100% dot area $40_n$, the central core area is made up of high density subdot areas $42_h$ and is surrounded by subdot areas $42_i$ having an intermediate density, with the remaining outermost peripheral portions of the dot area $40_n$ being made up of subdot areas $42_l$ having a low density. Similarly, with respect to FIG. 6b which illustrates an approximate 50% dot area $40_g$, the centralmost 22 subdot areas $42_h$ comprising the central core of the dot area 40 have a high density, whereas 18 of the surrounding subdot areas $42_i$ are of an intermediate density with the remaining subdot areas $42_l$ being of a low density. In FIG. 6c, which illustrates a dot area $40_a$ comprised of five subdot areas 42, only the central subdot area $42_h$ is of a high density, whereas the four peripheral subdot areas $42_l$ have a low density.

As noted above, the different density subdot areas $42_h$, $42_i$, $42_l$ can be produced by controlling the exposure time and/or the light intensity of the selected light sources 50 during the exposure of the dot areas 40. As it is preferable that the speed of operation for producing a dot area 40 for halftone screens be made as fast as possible, it is preferable to control the light intensity of the light sources 50 for producing the different subdot areas $42_h$, $42_i$, $42_l$ having different photographic densities. However, it should also be noted that if the apparatus 10 were to be operated at a relatively slow speed, similar dot area density gradients could be produced by illuminating selected ones of the light sources 50 for different periods of time during each interval. For example, the exposing head 24 could be intermittently moved relative to a stationary film 12 to provide a certain period of time for exposing each subdot area 42 on the film and in which the time of exposure of different selected light sources 50 would be varied depending on whether a high density subdot area $42_h$ is to be produced, an intermediate density subdot area $42_i$ is to be produced, or a low density subdot area $42_l$ is to be produced. Also, it will be appreciated that greater than three different density levels could be produced depending on the desired density gradient for the dot area 40 which is to be produced.

Figure 7:
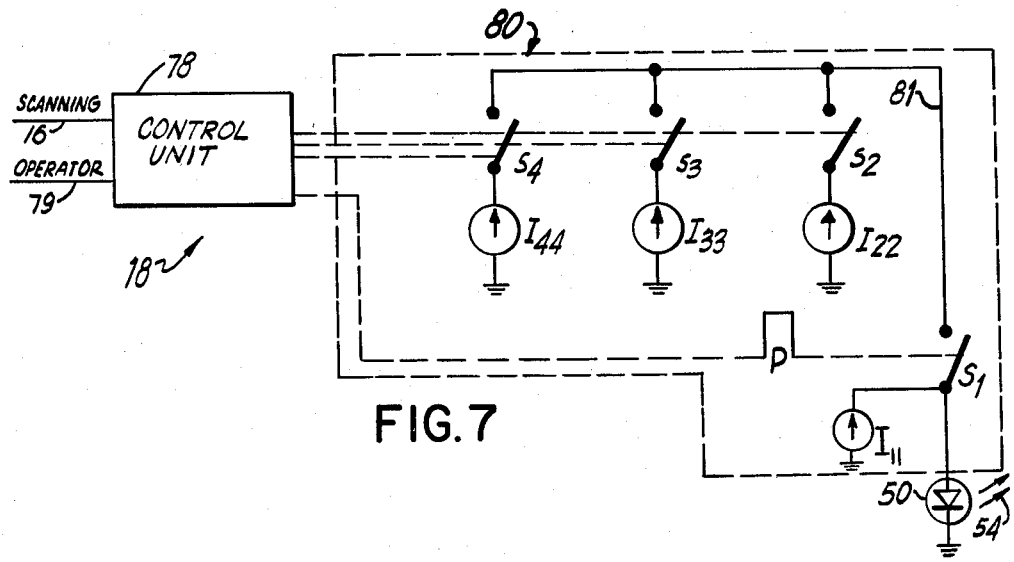
FIG. 7 is a schematic illustration of the circuitry which may be utilized for energizing the radiation sources in the exposing means in accordance with the present invention.

To better understand how different light intensity levels for the light sources 50 to produce different density subdot areas 42 is accomplished in the present invention, reference is made to FIG. 7 of the drawings. FIG. 7 represents a schematic illustration of a typical control circuit 80 which comprises a part of the radiation source control means 18 for each of the light emitting diodes 50 in the apparatus 10 for generating light signals or beams 30 for exposing the photographic film 12 in dot areas 40. As shown in FIG. 7, the radiation source control means 18 includes a control unit 78 and a plurality of control circuits 80, one control circuit 80 for each light emitting diode 50. Each control circuit 80 includes a plurality of current sources $I_{22}$, $I_{33}$, $I_{44}$, arranged in parallel to one another and adapted to be selectively coupled to line 81 in order to conduct current through the light emitting diode 50 in the circuit 80 to cause illumination of the diode 50, thereby generating a light signal 54. In this regard, a suitable switching device $S_1$, which may for example, comprise a transistor, is arranged in the line 81 between one terminal of the diode 50 and the current sources $I_{22}$, $I_{33}$, and $I_{44}$. Each of the current sources $I_{22}$, $I_{33}$, $I_{44}$ is adapted to be selectively coupled to the line 81 by means of suitable switching devices $S_2$, $S_3$, $S_4$, respectively, so as to apply current to the diode 50 when $S_1$ is closed. It will be appreciated that the current which is directed through the diode 50 will correspond to the current of the sourcce $I_{22}$, $I_{33}$, or $I_{44}$ whose respective switch $S_2$, $S_3$, or $S_4$ is closed.

In this regard, as is well known, the intensity of light signal 54 produced by the light emitting diode 50 is proportional to the current which passes through the light emitting diode 50, i.e., the more current through the light emitting diode 50, the higher the intensity level of the light signal 54 emitted thereby. Thus, if a relatively low current is directed through the light emitting diode 50, the intensity of the light signal 54 produced thereby will be of a lower value than if a higher current is conducted therethrough. Accordingly, by suitably choosing the current levels of the current sources $I_{22}$, $I_{33}$, $I_{44}$, it is possible by selectively closing the switches $S_2$, $S_3$, $S_4$, to selectively control the intensity of the light emitted by the diode 50. In this regard, the current source $I_{22}$ is chosen to be of a lower current than the current produced by the current source $I_{33}$, and the current produced by the source $I_{44}$ is chosen to be higher than the current produced by the sources $I_{22}$ and $I_{33}$.

The control unit 78 is operative to selectively close one of the switches $S_2$, $S_3$, $S_4$, depending on the desired intensity of the light to be emitted by the diode 50, when the switch $S_1$ is closed by the control unit 78. Here, it is to be recalled that in the preferred embodiment, the electronic scanning signal 16 is applied to the radiation source control means 18 and the radiation source control means 18 combines a screen generation or timing signal therewith. The screen generation or timing signal is used to control the appropriate instant that the switch $S_1$ is closed for the particular diode 50 in the circuit 80, whereas the scanning signal 16 and the operator signal 79 (for programmed density control to be discussed more fully hereinbelow) are used to control which, if any, of the switches $S_2$, $S_3$, $S_4$ is to be closed. In this regard, if none of the switches $S_2$, $S_3$, $S_4$ is closed, the current from the sources $I_{22}$, $I_{33}$, $I_{44}$ will not be applied across the diode 50 when $S_1$ is closed.

In the embodiment shown in FIG. 7, the electronic scanning signal 16 is applied to the control unit 78, and the control unit 78 generates the appropriate timing signal, depending on the desired halftone screen size to be generated, to close $S_1$ at the appropriate intervals. That is, when the exposing head 24 is positioned to expose a dot area 40 on the lithographic film 12, i.e., when the center of the exposure head 24 is aligned with the desired dot center on the film 12, a pulse P is provided to the switching device $S_1$ to thereby close the switch $S_1$ for a period corresponding to the width of the pulse P. If no subdot area 42 is to be produced at that location by the particular light emitting diode 50 of the particular circuit 80, the control unit 78 serves to maintain the switches $S_2$, $S_3$, $S_4$ of the particular circuit 80 in an open state. If a low intensity light signal 54 is to be produced by the particular diode 50 to produce a low density subdot area $42_l$ on the film 12, then the switch $S_2$ is closed by the control unit 78 so that a low current is conducted through the light emitting diode 50 when the switch $S_1$ is closed. Likewise, if an intermediate density subdot area $42_i$ is to be produced, the switch $S_3$ is closed to conduct current from the source $I_{33}$ through the particular light emitting diode 50 so as to product light of an intermediate intensity, and similarly, if a high density subdot area $42_h$ is to be produced, the switch $S_4$ is closed to conduct current from the source $I_{44}$ through the particular light emitting diode 50.

Figure 8:
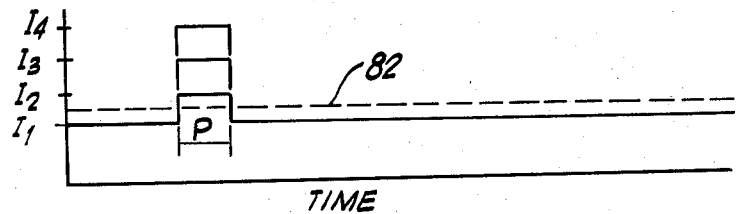
FIG. 8 is a graphic representation of the intensity profiles for individual subdot areas which may be produced in accordance with the circuitry shown in FIG. 7, the sensitivity threshold of the recording medium being indicated by the dotted line 82 thereon.

Thus, it will be appreciated that in accordance with the present invention, as the film 12 and exposure head 24 move relative to one another, when the exposure head 24 is aligned with each new dot center on the film 12, a pulse P having a width corresponding to the length of time for exposure will be provided to close the switches $S_1$ of each of the circuits 80. During or just prior to this interval, suitable signals from the control unit 78 serve to selectively close one of the switches $S_2$, $S_3$, $S_4$, or to maintain all of the switches $S_2$, $S_3$, $S_4$ open, depending on the type of subdot 42 to be produced. Graphic representations of the intensity profiles of the light signals 54 emitted by the diode 50 are shown in FIG. 8 in which $I_2$ represents the intensity of the light emitted when the current source $I_{22}$ is coupled to the diode 50, $I_3$ represents the intensity of the emitted light when the circuit source $I_{33}$ is coupled to the diode 50, and $I_4$ represents the intensity when the circuit source $I_{44}$ is coupled to the diode 50. In FIG. 8, it is seen that the intensity $I_4$ is greater than the intensity $I_3$ and $I_2$ and the intensity $I_3$ is greater than the intensity $I_2$. Also, the width of the pulse P (also shown in FIG. 5) corresponds to the exposure time that the diode 50 remains illuminated, i.e., the period that the switch $S_1$ remains closed.

The current source $I_{11}$ shown in FIG. 7 is for the purpose of pre-exposing the lithographic film 12 so that the additional energy required to produce the subdot areas 42 on the film 12 may be of a lower value. More particularly, as is well known, typical radiation sensitive recording mediums 12 used in connection with image generation have a threshold intensity level below which an image will not be produced on the film 12. This threshold level is represented graphically in FIG. 8 by the dotted line 82. So long as the light signal 30 directed onto the film 12 has an intensity level below the threshold level 82, no subdot area 42 will be produced on the film 12, i.e., no exposure of a subdot area 42 will be visible on the film 12.

The current source $I_{11}$ is connected to line 81 to conduct current continuously through the diode 50 in the control circuit 80, the current generated by the source $I_{11}$ being of a value such that the light signal 54 emitted by the diode 50 will have an intensity which is below the threshold intensity level 82 of the film 12. Consequently, the film 12 is continuously pre-exposed by an intensity $I_1$ which is below the threshold level 82 of the film 12 (see FIG. 8). The current from the source $I_{11}$ may be continuously applied to the diode 50 since the light signal 54 emitted having an intensity $I_1$ does not serve to expose or create an image on the film 12.

In connection with the operation of the remaining portion of the circuit 80 shown in FIG. 7, assuming that one of the switches $S_2$, $S_3$ or $S_4$ is closed, when the switch $S_1$ closes, the current from one of the sources $I_{22}$, $I_{33}$, or $I_{44}$ will be added to the current from the source $I_{11}$, and applied across the diode 50 so that the intensity of the light emitted by the light emitting diode 50 will be above the predetermined threshold level 82, and thus expose the film 12 (see FIG. 8).

Accordingly, it will be appreciated that the film 12 is exposed by simply increasing the current being conducted through the light emitting diode 50 so as to be at an intensity above the threshold level 82, i.e., from $I_1$ to either $I_2$, $I_3$ or $I_4$. Since the intensity $I_1$ may be only slightly below the threshold level 82, the amount of change in current when it is desired to expose a subdot area 42 on the film 12 may be relatively small, thus advantageously prolonging the life of the light emitting diode 50. This feature also allows for a less sensitive film 12 to be utilized as the recording medium.

Therefore, as the film 12 and exposing head 24 move relative to one another, the film 12 is continuously exposed with various light emitting diodes 50 at an intensity level below the threshold 82 of the film 12, as controlled by the current source $I_{11}$. When it is desired to create subdot areas 42 on the film 12, one of the switches $S_2$, $S_3$, $S_4$ will be closed when the switch $S_1$ is closed, depending on whether a low, intermediate or high density subdot area 42 is to be produced. For those light emitting diodes 50 which are not to produce subdot areas 42 on the film 12, the switches $S_2$, $S_3$ and $S_4$ in the respective circuits 80 will remain open, and no corresponding subdot area 42 will be produced on the film 12.

It will of course be appreciated that the current sources $I_{11}$, $I_{22}$, $I_{33}$, $I_{44}$ in the circuit 80 may comprise voltage sources $V_S$ coupled with a resistor R in the circuit 80 between the voltage source $V_S$ and the ground to which the diodes 50 are connected. This resistor R for example may be provided between the diode 50 and the ground, as schematically illustrated in FIG. 9.

Accordingly, with the present invention, a series of dot areas 40 may be produced on a film 12 in which each of the dot area 40 is comprised of one or more subdot areas 42. The photographic density of the various subdot areas 42 comprising the overall dot area 40 may in turn be controlled to provide a density gradient within and across the dot area 40 so as to permit precise manipulation of the size of the dot area 40 after it has been produced on the film 12, such as by conventional chemical etching of the low density subdot areas $42_l$. This capability of manipulation is most important in connection with correction of halftone image reproductions which previously were not possible with electronically generated halftone images.

Further in this regard, it will be appreciated that it is preferable that the photographic density of the various subdot areas 42 be uniform for each of the density levels corresponding to the different light intensity levels $I_2$, $I_3$, $I_4$ of the light emitting diodes 50. In other words, it is desirable in order to permit the precise and desired etchability feature discussed hereinabove that all low density subdot areas $42_l$ which are to be produced be of approximately the same photographic density irrespective of which light emitting diodes 50 are utilized for producing the subdot areas $42_l$, and likewise, that all intermediate density subdot areas $42_i$ are of approximately the same density, and all high density subdot areas $42_h$ are of the same density. As the photographic film 12 is of a uniform sensitivity, this requires that each of the different circuits 80 be constructed so that when a particular current source is applied to the light emitting diode 50, the intensity of the light signals 54 emitted will be substantially the same for all of the various diodes 50 in the exposing head 24, i.e., the intensity level $I_2$, $I_3$, $I_4$, respectively, will be essentially the same for each of the diodes 50.

Figure 9:
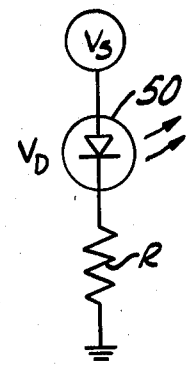
FIG. 9 is a schematic representation of a circuit arrangement for the light emitting diodes by which the intensity of the light emitted by the diodes may be standardized.

While various different means may be employed to accomplish this, one convenient means for doing so when a voltage source is utilized for generating the current to be conducted through the diodes 50 comprises varying the resistance value of the resistor R associated with each respective diode 50 in the circuit 80 (see FIG. 9). As noted above, when a voltage source $V_S$ is utilized, there is a resistor R in series with the diode 50. As can be appreciated, the value of this resistor R may be chosen so as to produce a desired intensity for the light emitted by the diode 50 when current is conducted therethrough. For example, with reference to FIG. 9, there is shown a sample circuit in which a voltage source $V_S$ is connected across a diode 50 and a resistor R. The current passing through the light emitting diode 50 is related to the voltage of the source $V_S$, the voltage $V_D$ across the diode 50, and the value of the resistor R. This relationship is $I=(V_S-V_D)/R$ where I represent the current passing through the light emitting diode 50, $V_S$ is the voltage of the voltage source, R is the resistance of the resistor and $V_D$ is the voltage across the diode 50. As the intensity of the light emitted by the light emitting diode 50 is proportional to the current passing through the diode 50, the intensity of the light will be inversely proportional to R. As $V_D$ is known or can be measured with respect to each diode 50, it will be appreciated that the intensity of the light emitted by the diode 50 is dependent on the value of the resistor R.

Therefore, it is possible to produce desired uniform intensity levels for given voltage sources $V_S$ by simply changing or modifying the value of the resistor R for each of the diodes 50 in the circuits 80 so as to produce a relatively uniform intensity for the light being emitted by the diode 50 for a given voltage level. This capability of providing substantially uniform intensity levels for each of the different density subdot areas 42 is advantageous for producing desired gradients across the dot areas 40 as it ensures for more precise control of the capability of manipulation for the purposes of correction of halftone image reproductions after generation of dot areas 40 on the film 12.

Further in this regard, although only three different intensity levels $I_2$, $I_3$, $I_4$ have been illustrated and described hereinabove, it will be appreciated that the number of different intensity levels for providing the desired gradients can be chosen as desired. In some instances, two different intensity levels may prove satisfactory whereas in other instances four or five, or even greater numbers of different intensity levels, and thus density values for the produced subdot areas 42, could be provided.

It is contemplated in accordance with the preferred embodiment of the present invention that predetermined density gradients for the produced dot areas 40 will be provided depending on the number, and thus the pattern, of the dot areas 40 produced. That is, a predetermined density gradient or density profile will be provided for each different size dot area 40 which is produced. Also, the predetermined density gradient preferably is suitably controlled by an operator input 79 so that a number of different particular density gradients may be provided. For example, it may be desired to produce dot areas 40 in which approximately 35% of the subdot areas 42 are of a relatively low density, whereas approximately 30% of the subdot areas 42 are of a relatively intermediate density, and approximately 35% of the subdot areas 42 are of a relatively high density. Once the particular density profile is selected by the operator input 79, the control unit 79 will automatically provide for the appropriate generation of signals for closing either the switches $S_2$, $S_3$, or $S_4$ in each of the control circuits 80. In this regard, since there is a subdot area progression utilized in accordance with the preferred embodiment (i.e., the subdot areas 42 for progressively larger dot areas 40 are added about the periphery of the dot area 40 in a spiral fashion, as discussed hereinabove with reference to FIGS. 3a–3n and 5), closing of the appropriate switches $S_2$, $S_3$ and $S_4$ in the control circuits 80 by the control unit 78 may be accomplished by simply generating appropriate signals to close switch $S_2$ in those circuits 80 for the light emitting diodes 50 for producing subdot areas 42 on the periphery of the dot area 40 (i.e., the light emitting diodes 50 in the end of the sequence), to close switch $S_3$ for those light emitting diodes 50 for producing the intermediate peripheral subdot areas 42 in the dot area 40 (i.e., the light emitting diodes 50 in the middle of the sequence), and to close switch $S_4$ for those light emitting diodes 50 for producing the innermost subdot areas 42 in the dot area 40 (i.e., the light emitting diodes 50 in the beginning of the sequence). For instance, in the example above in which a 35-30-35% density profile or gradient is to be provided, the control unit 78 would control the control circuits 80 so that the control circuits 80 for the light emitting diodes 50 corresponding to the last 35% of the diodes 50 in the subdot progression sequence will have the switch $S_2$ closed (i.e., referring to FIGS. 6a and 6b, the 35% of the subdot areas $42_l$ which are on the periphery of the dot area 40 to be produced, and which are represented by nonblackened or filled in circles) the control circuits 80 for the light emitting diodes 50 corresponding to the intermediate 30% of the diodes 50 in the subdot progression sequence will have $S_3$ closed (i.e., the 30% of the subdot areas $42_i$ which are represented by circles having a dot therein in FIGS. 6a and 6b), and the control circuits 80 for the light emitting diodes 50 corresponding to the intermost 35% of the diodes 50 in the subdot progression sequence will have $S_4$ closed (i.e., the 35% of the subdot areas $42_h$ which are represented by blackened or filled in circles in FIGS. 6a and 6b). Thus, it will be appreciated that because of the spiral nature of the subdot progression in accordance with the preferred embodiment, generation of various density profiles for the produced dot areas 40 can be easily obtained by a simple calculation of the number of subdot areas 42 which are to be of a low density, intermediate density, or high density in any particular dot area 40, and then suitably programming the radiation source control means 18.

As noted hereinabove, the present invention is particularly useful with respect to production of halftone images at different screen angles while at the same time still producing precise dot area sizes, shapes and configurations. In this regard, it is to be recalled that in color image reproductions, different colors are printed at different screen angles. Thus, a plurality of different halftone images must be produced, each having a different screen angle. In accordance with the present invention, the matrix 64 of the ends 63 of the fiber optic conductors 56 can be rotated about its axis to provide the angular orientations for different screen angles and thereby expose the film 12 with dot areas 40 of precisely controlled size, shape, configuration, and angular orientation. This results from the fact that the subdot areas 42 comprising each dot area 40 (or portion of dot area 40) are all produced during the same time interval as the film 12 and exposing head 24 move relative to one another.

More particularly, arrangements of desired dot centers for different halftone image reproductions are shown in FIGS. 10a, 10b, 10c and 10d for a conventional four-color process reproduction. Such different arrangements of dot center patterns are typical of those used in connection with halftone image reproductions for the printing of four different colors. That is, the halftone image for one color typically would be produced at a zero screen angle (FIG. 10a), a second halftone image reproduction for a second color would be produced at a +15° screen angle (FIG. 10b), a third halftone image for a third color would be produced at a −15° screen angle (FIG. 10c), and a fourth color halftone image would be produced at a screen angle of +45° (FIG. 10d). In the subsequent printing operation each halftone image (or a plate made therefrom) would be utilized for the printing of the different colors one at a time so that the different colors will be superimposed or registered one on the other on the paper or other print medium. In this regard, it should be noted that the dot center patterns shown in FIGS. 6a–6d are simply examples of typical dot patterns and screen angles used in connection with conventional four-color process reproductions. However, this is not meant to preclude other possible patterns, or other number separations in the set of separations. Also, the distances between the dot centers for the different patterns of dot centers may be equal, or they may be unequal, or even non-uniform.

Before discussing the production of angled half-tone images, reference is first made to FIG. 11 which illustrates an example of a subdot area generator 90 in accordance with the principles of the present invention for generating a plurality of rows of dot areas 40 on a film 12 as the film 12 and exposing head 24 move relative to one another, each of the dot areas 40 being comprised of one or more subdot areas 42.

The subdot area generator 90 corresponds to the exposing means 20 described hereinabove, and is capable of selectively generating one or more radiation signals, represented by the dot elements 92 in FIG. 11, for exposing the film 12 to produce subdot areas 42 thereon. In essence, the subdot area generator 90 shown in FIG. 11 comprises a matrix of possible radiation or light signals which can be generated, i.e., a matrix such as the matrix 32 shown in FIG. 2, with the understanding that as each dot area 40 is produced on the film 12, not all of the dot elements 92 will necessarily be illuminated; rather, the dot elements 92 of the subdot area generator 90 will be actuated depending on the size and pattern of dot areas 40 to be produced.

In this regard, although in the preferred embodiment the exposing means 20 includes a plurality of individual light sources 50 whose light signal output is reduced in size and is arranged in a matrix 32 having m rows and n columns, a different arrangement for the exposing means 20 could be provided. For instance, a single light source could be utilized which has its light output divided, such as by mirrors, to provide a plurality of separate light signals which may selectively expose a film. Further, depending on the system requirements, the light sources 50 could be arranged in a close matrix array such that fiber optic conductors 56 are not necessary, and/or the demagnification lens 60 in the preferred embodiment could be eliminated. The major requirement in accordance with the apparatus 10 of the present invention is the provision of a plurality of individual radiation signals 30 which are selectively operable to expose dot areas 40 on a recording medium 12 in one or more subdot areas 42.

In the embodiment shown in FIG. 11, the matrix of dot elements 92 of the subdot area generator 90 are arranged in 21 rows and 7 columns. In other words, the matrix of dot elements 92 is equivalent to three 7 by 7 arrays stacked one on top of the other. Thus, the total number of dot elements 92 is 147. For a zero screen angle production, the subdot area generator 90 is oriented as shown in FIG. 11 and moved relative to the film in the direction of the arrow 94, i.e., along a line which is parallel to one of the rows of dot elements 92. This relative movement could be accomplished by moving the subdot area generator 90 in the direction of the arrow 94, or by moving the film 12 in a direction opposite to the direction of the arrow 94, or a combination of both.

As the subdot area generator 90 and film 12 move relative to one another, the dot elements 92 are selectively actuated to thereby expose the film 12 in a series of dot areas 40, each comprised of one or more subdot areas 42. More particularly, in the embodiment shown in FIG. 11, three rows of dot areas 40 arranged in 6 columns are produced on the film 12. The three rows of dot centers are designated $R_1$, $R_2$, and $R_3$ and the six columns are designated $C_1$, $C_2$, $C_3$, $C_4$, $C_5$ and $C_6$ in FIG. 11. As the central column (i.e., the fourth column 96) of the matrix of dot elements 92 is aligned with the desired dot centers of each column on the film 12, the dot elements 92 are selectively actuated to produce dot areas 40 of a desired size, shape, and configuration at each of the dot centers of the three rows $R_1$, $R_2$, $R_3$.

More particularly, as the subdot area generator 90 is moved relative to the film 12, when the central column 96 of the dot elements 92 therein is aligned with the first column $C_1$ of desired dot centers on the film 12, the upper third or group $G_1$ of dot elements 92 (i.e., the grouping of dot elements 92 in the top seven rows of the subdot area generator 90) are selectively actuated to expose the film 12 to produce a dot area $40_{1,1}$ comprised of nine subdot areas 42 centered about the dot center of the row $R_1$ and column $C_1$. This would comprise illuminating those dot elements 92 which are in the third, fourth, and fifth rows and third, fourth and fifth columns of the subdot area generator 90. At the same time that the dot area $40_{1,1}$ at the row $R_1$ and column $C_1$ is exposed, the second grouping $G_2$ of dot elements 92 is selectively actuated to produce a dot area $40_{2,1}$ on the film 12 comprised of thirteen subdot areas 42 arranged in a diamond shaped pattern and centered at the dot center located in the second row $R_2$ and first column $C_1$. This dot area $40_{2,1}$ is generated by actuating those dot elements 92 in the 9th row, 4th column; 10th row, 3rd, 4th and 5th columns; 11th row, 2nd, 3rd, 4th, 5th and 6th columns; 12th row, 3rd, 4th and 5th columns; and 13th row, 4th column. Similarly, at this same time, the lower third or grouping $G_3$ of dot elements 92 is selectively actuated to expose a dot area $40_{3,1}$ about the desired dot center in the row $R_3$, column $C_1$ on the film 12 which is comprised of 21 subdot areas 42 arranged in a generally circular pattern. This dot area $40_{3,1}$ is generated at substantially the same instant that the dot areas $40_{1,1}$ and $40_{2,1}$ in the first and second rows $R_1$, $R_2$ of the first column $C_1$ are generated by actuating those dot elements 92 which are located in the 16th row, 3rd, 4th and 5th columns; 17th, 18th and 19th rows, 2nd, 3rd, 4th, 5th and 6th columns; and 20th row, 3rd, 4th and 5th columns. Thus, it will be appreciated that as the dot elements 92 are moved relative to the film 12, more than one row of dot areas 40 are exposed on the film 12 by selectively actuating selected ones of the dot elements 92 of the subdot area generator 90.

As the subdot area generator 90 continues to move relative to the film 12 in the direction of the arrow 94, dot areas 40 at rows $R_1$, $R_2$, and $R_3$ in the second column $C_2$ will be created by selective actuation of the dot elements 92 when the central column 96 of the subdot area generator 90 is aligned with the dot centers in column $C_2$. Similarly, when the central column 96 of the subdot area generator 90 is aligned with the dot centers of the third column $C_3$, dot areas 40 will be produced in rows $R_1$, $R_2$, and $R_3$ of the third column $C_3$, and so on with respect to the 4th, 5th and 6th columns $C_4$, $C_5$, $C_6$.

Other examples of the types of dot areas 40 which may be produced in this manner are shown in these columns $C_2$, $C_3$, $C_4$, $C_5$ and $C_6$ in FIG. 11. For example, at row $R_2$, column $C_2$, a diamond shaped dot area $40_{2,2}$ comprised of 5 subdot areas 42 has been produced, whereas at row $R_1$, column $C_4$, a diamond shaped dot area $40_{1,4}$ comprised of 25 subdot areas 42 is produced. At row $R_1$, column $C_6$, a full or 100% dot area $40_{1,6}$ comprised of 49 subdot areas 42 is produced, whereas at row $R_3$, column $C_5$, a dot area $40_{3,5}$ comprised of 37 subdot areas 42 is produced. Various other patterns are shown at the various other rows and columns.

Thus, it is possible to expose more than one dot area 40 at a given time during relative movement of the subdot area generator 90 and the film 12, and in particular when the type of motion as indicated in FIG. 11 is provided, to expose dot areas 40 at more than one row of dot centers in a single sweep of the subdot area generator 90 across the film 12. As can be appreciated, this capability can greatly speed up the time for exposing a film 12 in a series of dot areas 40 by reducing the number of sweeps of the subdot area generator 90 relative to the film 12. This type of operation is possible since each dot area 40 at different rows in a single column is produced during the same interval, and in particular since each dot area 40 is produced substantially instantaneously during the interval by simply actuating selected ones of the dot elements 92 in the subdot area generator 90.

Turning now to the generation of dot areas 40 at dot centers which are angled with respect to the direction of relative movement between the subdot area generator 90 and the film 12, it will be noted with reference to FIG. 12 that the subdot area generator 90 is inclined at an angle with respect to the direction of relative motion as indicated by the arrow 98. The angle of inclination corresponds to the desired screen angle of dot centers to be produced. For instance, in FIG. 12, the subdot area generator 90 is inclined at approximately a 15° angle with respect to the direction of relative movement. The desired pattern of dot centers is represented by a number of columns $C_1$, $C_2$, $C_3$, $C_4$, inclined at approximately a 15° angle from the vertical and a number of rows $R_1$, $R_2$, $R_3$, $R_4$, inclined at an approximately 15° angle from the horizontal in each of the columns $C_1$, $C_2$, $C_3$, $C_4$.

It will be appreciated that as the subdot area generator 90 is moved in the direction of the arrow 98, the central column 96 of dot elements 92 of the generator 90 will come into alignment with the dot centers lying along one of the columns to be generated. Just as in the FIG. 11 embodiment, when this occurs, the dot elements 92 of the subdot area generator 90 are selectively actuated to produce desired dot areas 40 at each of the rows within the one column. For example, with reference to FIG. 12, the dot area $40_{1,1}$ at the first row $R_1$ of the column $C_1$ to be produced is comprised of five subdot areas 42 arranged in a diamond pattern. At the same interval that the dot area $40_{1,1}$ at the row $R_1$, column $C_1$ is produced, the dot area $40_{2,1}$ at the row $R_2$, column $C_1$ may likewise be produced, which in FIG. 12 is comprised of 13 subdot areas 42 centrally arranged about the dot center. Similarly, the dot area $40_{3,1}$ at the row $R_3$, column $C_1$ is also produced during the same interval and in FIG. 12, is comprised of 9 subdot areas 42. If desired, however, the different dot areas could be produced sequentially instead of during the same interval.

When the subdot area generator 90 is inclined as shown in FIG. 12, as the subdot area generator 90 progresses in the direction of the arrow 98, the central column 96 of the groupings $G_1$, $G_2$, $G_3$ of dot elements 92 in the subdot area generator 90 will not be aligned with the respective dot centers in the rows $R_1$, $R_2$, $R_3$ of the column $C_2$, and in fact, the central dot elements 100, 102, 104 of each of the groupings $G_1$, $G_2$ and $G_3$ will not be aligned with the dot centers of any of the rows of $R_1$, $R_2$, $R_3$ or $R_4$ in the 2nd column $C_2$. Rather, when the central column 96 of dot elements 92 is aligned with the column $C_2$, the dot centers in the rows $R_2$ and $R_3$ of column $C_2$ will be located between the dot elements 92 of the 7th and 8th rows and 14th and 15th rows, respectively, of the central column 96. Thus, to produce dot areas $40_{2,2}$ and $40_{3,2}$, a different grouping of dot elements 92 will have to be utilized. Specifically, to produce the dot area $40_{2,2}$ comprised of 9 subdot areas 42, the dot elements 92 in the 6th, 7th, and 8th rows and in the 3rd, 4th and 5th columns of the subdot area generator 90 will be actuated when the central column 96 of dot elements 92 of the subdot area generator 90 is aligned with the dot centers in the column $C_2$. Likewise, to produce the dot area $40_{3,2}$ comprised of 5 subdot areas 42, the dot elements 92 in the 13th row, 4th column; 14th row, 3rd, 4th and 5th columns; and the 15th row, 4th column will be actuated. In each of these instances, the center of the dot area $40_{2,2}$ and $40_{3,2}$ will not be precisely aligned with the dot center.

Also, part of the dot areas $40_{1,2}$ and $40_{4,2}$ at rows $R_1$ and $R_4$ of column $C_2$ will be produced at this time, as indicated in FIG. 12. The portions of these dot areas $40_{1,2}$ and $40_{4,2}$ which are produced are the portions lying below the dot center of row $R_1$, column $C_2$ and above the dot center of row $R_4$, column $C_2$. In particular, the portions of dot area $40_{1,2}$ will be produced by the dot elements 92 in the 1st row, 2nd, 3rd, 4th, 5th and 6th columns; 2nd row, 3rd, 4th and 5th columns; and 3rd row, 4th column, and the portions of the dot area $40_{4,2}$ will be produced by the dot elements 92 in the 19th row, 4th column; 20th row, 3rd, 4th and 5th columns; and 21st row, 2nd, 3rd, 4th, 5th and 6th columns of the subdot area generator 90. The remaining portions of the dot areas $40_{1,2}$ and $40_{4,2}$ will be produced during different passes of the subdot area generator 90.

As the subdot area generator 90 continues to move relative to the film 12 in the direction of the arrow 98, the central dot element 100 of the first grouping $G_1$ of dot element 92 will come into alignment with the dot center lying in the row $R_2$ and column $C_3$, the dot element 102 at the center of the second grouping $G_2$ of dot elements 92 will come into alignment with the dot center at row $R_3$, column $C_3$, and the central dot element 104 of the third grouping $G_3$ of dot elements 92 in the subdot area generator 90 will come into alignment with the dot center at row $R_4$ of the column $C_3$. When this occurs, the dot areas 40 in the column $C_3$ will be produced during a single interval by selective actuation of the various dot elements 92 of the subdot area generator 90. For instance, the dot area $40_{2,3}$ at the row $R_2$, column $C_3$ is comprised of a diamond shaped pattern of 25 subdot areas 42, the dot area $40_{3,3}$ at the row $R_3$, column $C_3$ is comprised of a circular pattern of 21 subdot areas 42, and the dot area $40_{4,3}$ at the row $R_4$, column $C_3$ is comprised of a single subdot area 42.

Likewise, as the subdot area generator 90 continues to move relative to the film 12, the central column 96 of the dot elements 92 of the subdot area generator 90 will come into alignment with the dot centers of the column $C_4$. When this occurs, the dot elements 92 of the subdot area generator 90 will be selectively actuated to produce dot areas $4_{3,4}$ and $40_{4,4}$ on the film 12, and to partially produce the dot areas $40_{2,4}$ and $40_{5,4}$ (not shown) utilizing different groupings of dot elements 92, similar to the manner of producing the dot areas $40_{2,2}$ and $40_{3,2}$ and partially producing the dot areas $40_{1,2}$ and $40_{4,2}$ along the column $C_2$.

Thus, as the subdot area generator 90 progresses relative to the film 12, the subdot area generator 90 will produce dot areas 40 in different rows as each new column of dot centers is reached. To produce the other rows of dot areas 40 in the columns (e.g., the dot areas 40 at row $R_4$, column $C_1$, and at row $R_1$, columns $C_3$ and $C_4$), and completion of the dot areas 40 in some of the columns (i.e., at rows $R_1$ and $R_4$ in column 2 and at row $R_2$ in colunn $C_4$), the subdot area generator 90 is indexed downwardly or upwardly for different sweeps. This is necessary since the subdot area generator 90 is moved along a line which is not parallel to the rows and columns of dot areas 40 to be produced.

Figure 13:
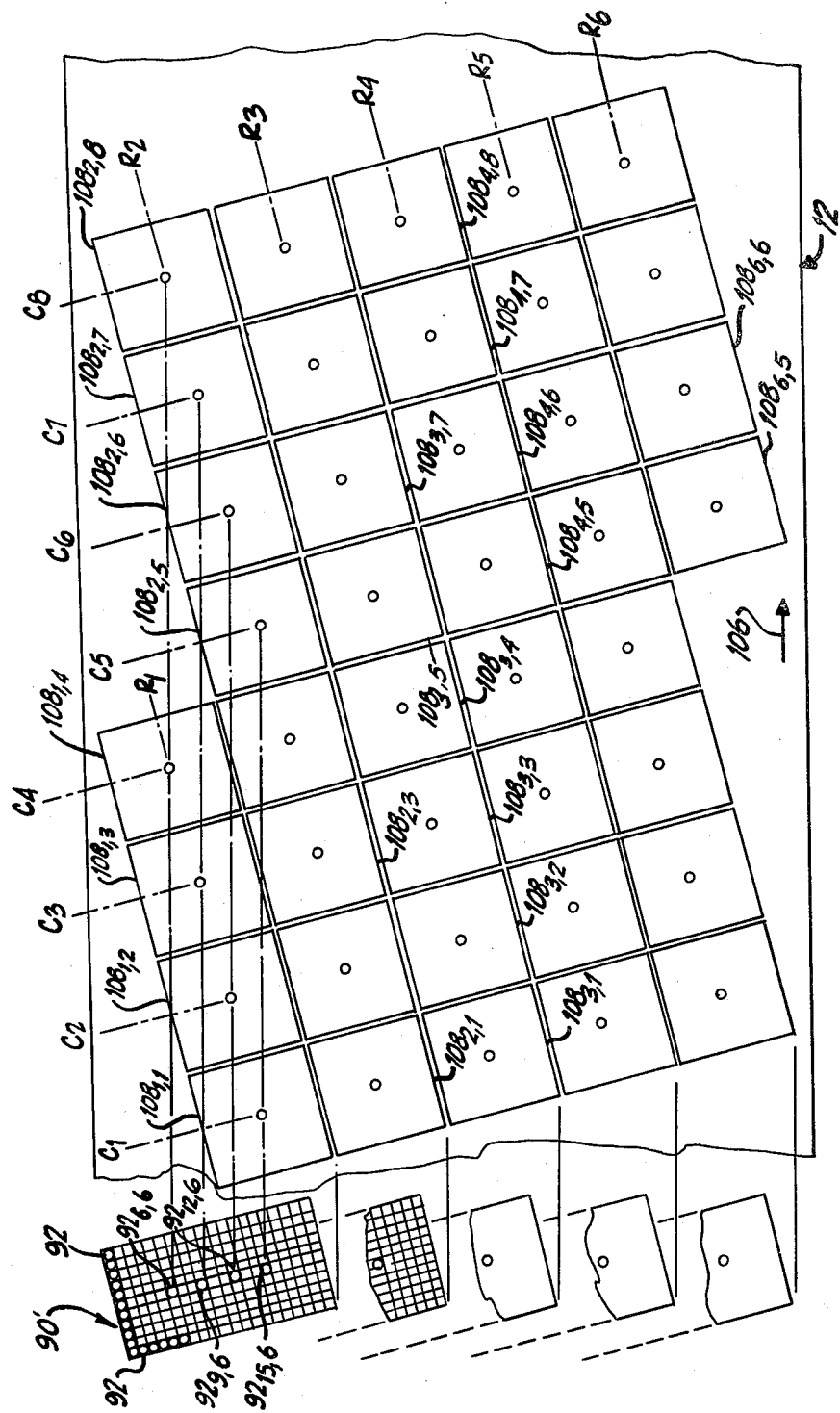
FIG. 13 is a further schematic illustration of another matrix of radiation signals angularly inclined with respect to the direction of relative movement of the radiation means and radiation sensitive recording medium, illustrating another technique for generating dot area patterns on the radiation sensitive recording medium. In this FIG. 13, only the arrangement of dot centers of the dot areas to be produced, and not specific dot area patterns, are shown.

FIG. 13 illustrates another arrangement for generating dot areas 40 at dot centers which are angled with respect to the direction of relative movement between the subdot area generator 90' and the film 12, and more particularly for generating dot area patterns in which the dot centers are angled at approximately a 15° angle. The arrangement shown in FIG. 13 also illustrates how the subdot area generator 90' may be utilized for generating angled screens in which different groupings of the subdot elements 92 in the subdot area generator 90' are employed for generation of dot areas 40 at different centers. More particularly, in FIG. 13, the subdot area generator 90 is inclined at a 14° 2' angle with respect to the direction of relative movement between the subdot area generator 90' and the film 12 (indicated by the arrow 106). The desired pattern of dot areas 40 is represented by the square boxes 108 which are arranged in side-by-side relationship in a series of columns $C_1$, $C_2$, $C_3$, etc., which are inclined at an angle of 14° 2' from the vertical, and a number of rows $R_1$, $R_2$, $R_3$, $R_4$, $R_5$ and $R_6$ which are inclined at a 14° 2' angle from the horizontal. It will be appreciated that the subdot area generator 90' is moved in a direction of the arrow 106 so that as the subdot area generator 90' moves across the film 12, the center of different groupings of subdot elements 92 become aligned with the dot centers of each of the square boxes 108 representing specific dot areas 40 to be produced. The dot patterns which may be produced have not been shown in FIG. 13, but would in essence correspond to the dot area patterns shown in FIGS. 3a-3n. As the subdot area generator 90' is moved into alignment with different dot centers, the dot elements 92 thereof are selectively actuated to produce desired dot areas 40 about each of the dot centers, but in a slightly different manner from that described with respect to the embodiment shown in FIGS. 11 and 12.

More particularly, the subdot area generator 90' comprises a matrix of dot elements which are arranged in 11 columns and 20 rows, i.e., an 11 by 20 matrix. As the subdot area generator 90' moves across the film 12 in the direction of the arrow 106, the dot centers of the box 108 will become aligned with one of the subdot elements 92 in the 6th or central column of the subdot area generator 90'. For example, as the subdot area generator 90' moves across the film 12, the subdot element $92_{15,6}$ located in the 15th row, 6th column will become aligned with the dot center of the box $108_{1,1}$ at the first row $R_1$ and column $C_1$. This dot element $92_{15,6}$ lies at the center of a grouping of subdot elements 92 of an 11 by 11 matrix, i.e., the grouping comprising the 10th–20th rows and 1st–11th columns. The subdot elements 92 of this grouping may be selectively actuated at the instant that the dot element $92_{15,6}$ becomes aligned with the dot center of the box $108_{1,1}$ to expose the desired dot area thereat. As the subdot area generator 90' continues to progress in the direction of the arrow 106, the dot element $92_{12,6}$ at the 12th row, 6th column, will become aligned with the dot center of the box $108_{1,2}$ at row $R_1$, column $C_2$. This subdot element $92_{12,6}$ is the central dot element of an 11 by 11 matrix of subdot elements which comprises the 7th–17th rows and the 1st–11th columns of the subdot area generator 90'. When the dot element $92_{12,6}$ is aligned with the dot center at the 1st row $R_1$, 2nd column $C_2$, the dot elements 92 of the second grouping will be selectively actuated to expose the desired dot area 40 (not shown) at row $R_1$, column $C_2$ on the film 12.

In the like manner, as the subdot area generator 90' continues to progress, the dot element $92_{9,6}$ will become aligned with the dot center of the box $108_{1,3}$. This dot element $92_{9,6}$ is the central dot element of the grouping of subdot elements 92 of the subdot area generator 90' which comprises the subdot elements in 4th–14th rows and 1st–11th columns. Selective actuation of the subdot elements 92 of this grouping will produce a dot area 40 (not shown) at the location of the box $108_{1,3}$. Similarly, during continued relative movement between the film 12 and the subdot area generator 90', the dot element $92_{6,6}$ will become aligned with the dot center of the box $108_{1,4}$. The dot element $92_{6,6}$ comprises a central dot element of the grouping comprising 1st–11th rows and 1st–11th columns of the subdot area generator 90', which grouping may be selectively actuated to produce the dot area 40 about the dot center in the box $108_{1,4}$.

Continued movement of the subdot area generator 90' brings the dot element $92_{15,6}$ into alignment with the dot center of the box $108_{2,5}$. The grouping of subdot elements 92 of which dot element $92_{15,6}$ is the center will then be selectively actuated to produce the desired dot area 40 in the box $108_{2,5}$. In a similar fashion, as the subdot area generator 90' progresses, the subdot elements 92 thereof will be selectively actuated to produce dot areas 40 (not shown) at the boxes $108_{2,6}$, $108_{2,7}$ and $108_{2,8}$, respectively, utilizing the different groupings in which the central subdot element 92 changes position in the subdot area generator 90', i.e., the central subdot elements $92_{12,6}$, $92_{9,6}$ and $92_{6,6}$, respectively. After producing the dot areas 40 at these locations, the subdot area generator 90' is indexed downwardly one increment and then moved relative to the film in the direction corresponding to the arrow 106 (or in the opposite direction) to produce the dot areas 40 at the location of the boxes 108 in the 2nd row, columns 1-4 and in the 3rd row, columns 5-8. Thereafter, the subdot area generator is then moved downwardly another increment and moved relative to the film 12 to produce dot areas 40 at the locations of the boxes $108_{3,1}$, $108_{3,2}$, $108_{3,3}$, $108_{3,4}$, $108_{4,5}$, $108_{4,6}$, $108_{4,7}$, $108_{4,8}$, etc.

Thus, it will be appreciated that in accordance with this aspect of the present invention different subdot elements 92 of the subdot area generator 90' may comprise the central subdot element 92 of different groupings of subdot elements 92 for exposing dot areas 40 at dot centers which are inclined at an angle with respect to the direction of relative movement. In other words, unlike the embodiments shown with respect to FIGS. 11 and 12, in which the center of the subdot element groupings $G_1$, $G_2$, $G_3$ remains fixed, in the embodiment shown in FIG. 13, different subdot elements 92 of the subdot area generator 90' comprise the central dot elements 92 of different groupings depending on the location of the dot areas 40 to be produced. In this regard, it will be appreciated that the subdot elements 92 in the various rows of the subdot area generator 90' in one instance may comprise peripheral subdot elements (i.e., located about the perimeter of the grouping) whereas in another instance they may comprise a central row of subdot elements 92 of a different grouping for generating a different dot area 40.

Figure 14:
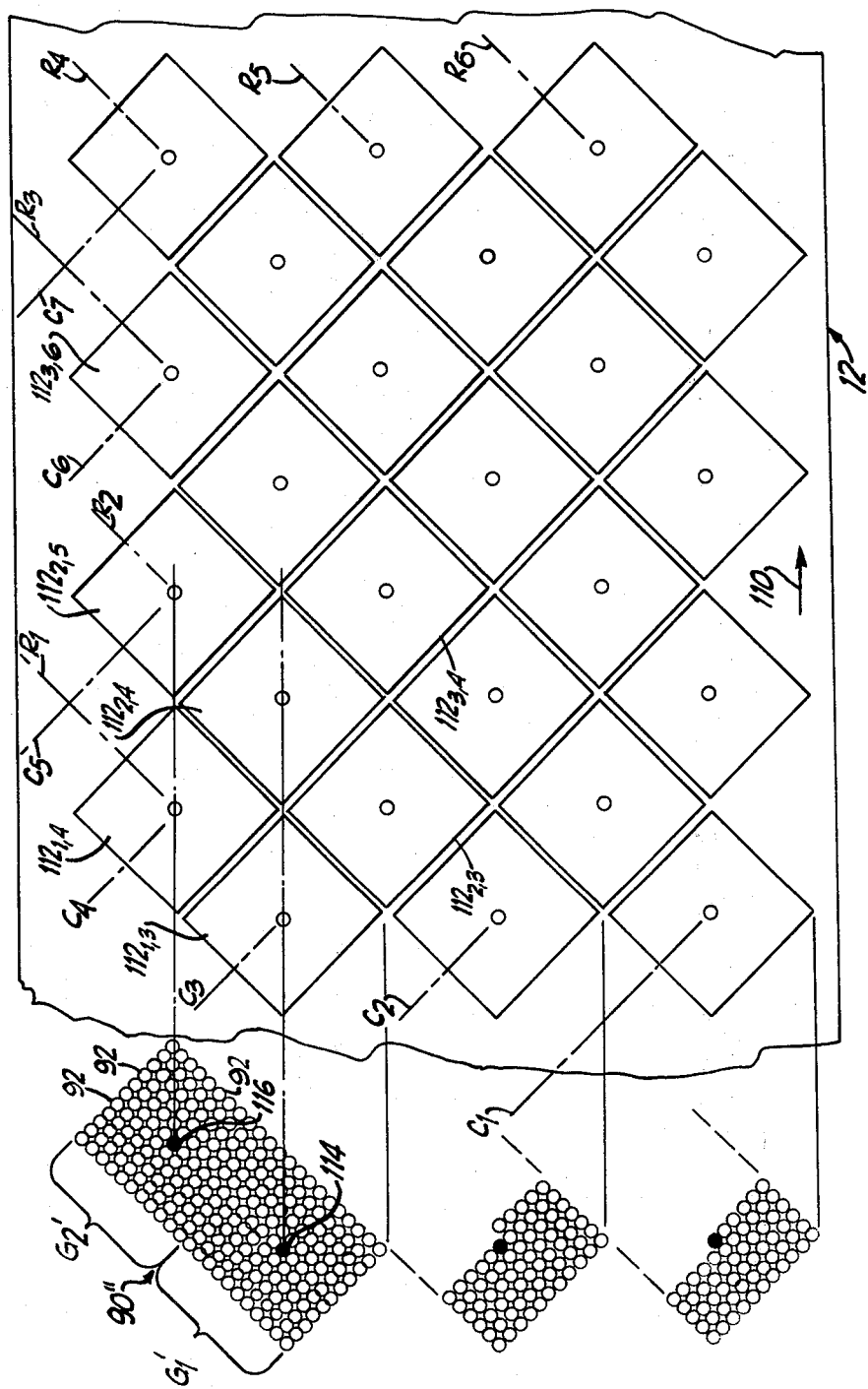
FIG. 14 is a still further schematic illustration of another matrix of radiation signals which are angularly inclined and illustrating another technique for generating a dot area pattern from that shown in FIGS. 12 and 13. Again, only the arrangement of the dot centers of the dot areas to be produced, and not specific dot area patterns, are shown.
Figure 15B:
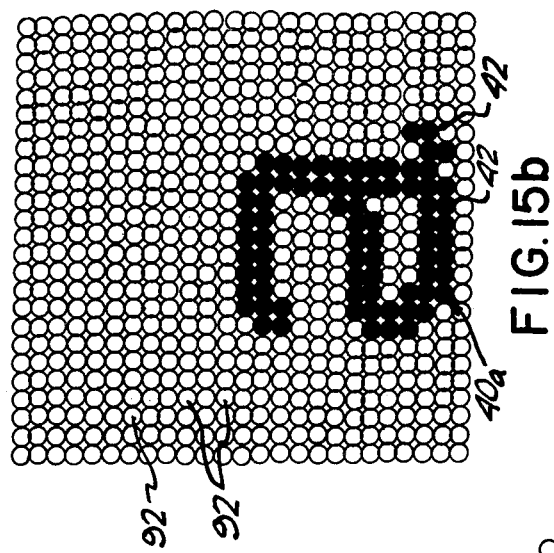
FIGS. 15a, 15b, and 15c are enlarged representations of alphanumeric characters which may be produced by a 25 by 25 matrix of radiation signals, the alphanumeric characters being represented by blackened subdot areas superimposed on a 25 by 25 matrix of subdot areas.
Figure 15C:
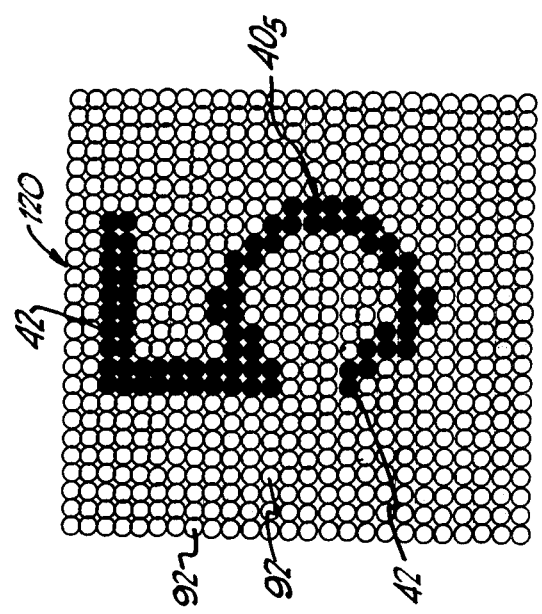
Figure 15A:
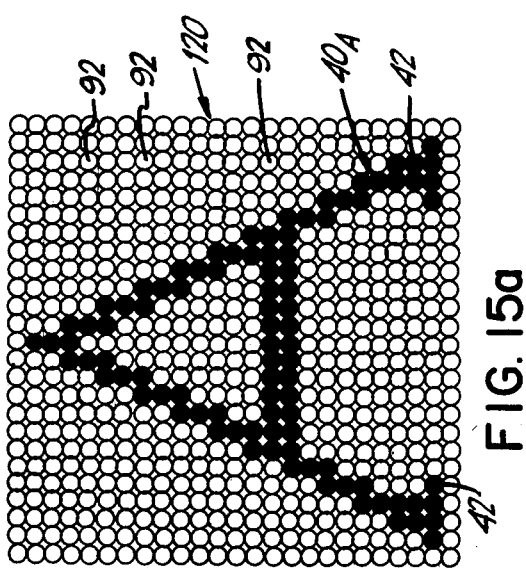

A further example of the generation of dot areas 40 at dot centers which are angled with respect to the direction of relative movement between the subdot area generator 90" and the film 12 is shown in FIG. 14 in which the angle of inclination of the subdot area generator 90" is approximately 45° relative to the direction of movement (indicated by the arrow 110). In this regard, the dot centers are located at a 45° angle with respect to the vertical and horizontal directions and are arranged in rows $R_1$, $R_2$, $R_3$, etc., and columns $C_1$, $C_2$, $C_3$, etc. In this regard, the subdot area generator 90" comprises an 11 by 22 matrix of subdot elements 92 in which the subdot area generator 90" is divided into two groupings $G_1'$, $G_2'$ each comprising an 11 by 11 matrix arranged side by side. As the subdot area generator 90" moves relative to the film 12 in the direction of the arrow 110, the central dot elements 114, 116, of the two groupings $G_1'$, $G_2'$ will become simultaneously aligned with the dot centers of two square boxes 112 lying in the same row and different columns, i.e., the first row $R_1$ and the 3rd and 4th columns $C_3$, $C_4$. When this occurs, the subdot elements 92 will be selectively actuated to produce the dot areas 40 (not shown) at the location of the two boxes $112_{1,3}$ and $112_{1,4}$. During continuous movement, the central dot elements 114, 116 of the two groupings $G_1'$, $G_2'$ will become aligned with the dot centers in the 2nd row, 4th and 5th columns, and thereafter in the 3rd row, 5th and 6th columns, etc. After one pass, the subdot area generator 90" is indexed downwardly relative to the film 12 to expose the dot areas at the 2nd row, 2nd and 3rd columns; 3rd row, 3rd and 4th columns; 4th row, 4th and 5th columns, etc. in a manner similar to the indexing downwardly of the subdot area generator 90' shown and described hereinabove with reference to FIG. 13.

Thus, it will be appreciated that different groupings of dot elements 92 of the subdot area generator 90 may be utilized for producing different dot areas 40 on a film 12 depending on the inclination of the subdot area generator 90, and the location of desired dot centers on the film 12. Thus, one of the dot elements 92 may serve to produce a subdot area 42 corresponding to the center of a dot area 40 at one interval and produce a peripheral subdot area 42 at another interval (see FIG. 13). Further, when the subdot area generator 90 is inclined, the centers of the dot areas 40 to be produced need not always precisely correspond with specified dot elements 92 of the subdot area generator 90. Rather, the dot elements 92 may be offset with respect to the desired dot centers, as was illustrated in FIG. 12 with respect to the columns $C_2$ and $C_4$. Still further, the complete dot areas 40 may be produced on the film 12 during different sweeps of the subdot area generator 90, as was the case with the dot areas $40_{1,2}$, $40_{4,2}$ in column $C_2$ and dot areas $40_{2,4}$ and $40_{5,4}$ in column $C_4$ in FIG. 12.

It is particularly important to note in this regard that with the present invention it is possible to produce a dot area 40 of a precisely desired shape and configuration by virtue of the fact that the subdot area generator 90 may be inclined to correspond to a desired screen angle for a halftone image reproduction. That is, by angling the subdot area generator 90 in this manner, and since the dot area 40 (or a portion thereof) is produced during a single interval by selective actuation of the dot elements 92 thereof, precisely inclined dot areas 40 of a desired shape and configuration may be produced despite the fact that relative movement between the subdot area generator 90 and the film 12 is in a direction different from the angle of inclination. This is most important since it allows for more precise control of the size, shape, position and configuration of the dot areas 40 produced, not only from the standpoint that the dot areas 40 are each comprised of a plurality of subdot areas 42 but also from the standpoint that the outline of the dot area 40 (i.e., the shape or configuration) is not dependent upon the dot elements 92 remaining illuminated for a specified period of time while relative motion is effected so as to produce a dot area by virtue of a series of bands, as in the prior art systems. As can be appreciated, this enhances the degree of flexibility of the apparatus 10 in accordance with the present invention.

It should also be noted in this regard that although it has not been illustrated in FIGS. 11-14, the various dot areas 40 produced on the film 12 may have a desired density gradient across and/or within the dot area 40 by utilizing the principles discussed hereinabove with respect to FIGS. 6a-6c, 7, 8 and 9. In other words, density gradients could be produced by varying the intensity of light emitted by selected dot elements 92 when they are actuated.

While the present invention has been described mainly with reference to the production of halftone images, it should also be appreciated that the apparatus 10 could also be utilized for producing alphanumeric characters or other shapes and configurations. For ex-

UNITED STATES PATENT AND TRADEMARK OFFICE
CERTIFICATE OF CORRECTION

PATENT NO. : 4,365,275
DATED : December 21, 1982
INVENTOR(S) : Berman et al

It is certified that error appears in the above-identified patent and that said Letters Patent are hereby corrected as shown below:

Column 10, line 45, "floor" should read --fiber--.
Column 21, line 12, "product" should read --produce--.
Column 24, line 10, "79" (second occurrence) should read --78--.
Column 34, line 13 "conprise" should read --comprise--.
Column 36, line 25, after "produce" insert --at selected
    intervals one or more light signals to produce--.

Signed and Sealed this

Thirty-first Day of May 1983

[SEAL]

Attest:

DONALD J. QUIGG

*Attesting Officer*     *Acting Commissioner of Patents and Trademarks*

UNITED STATES PATENT AND TRADEMARK OFFICE
CERTIFICATE OF CORRECTION

PATENT NO. : 4,365,275
DATED : December 21, 1982
INVENTOR(S) : Berman et al

It is certified that error appears in the above-identified patent and that said Letters Patent are hereby corrected as shown below:

Column 10, line 45, "floor" should read --fiber--.
Column 21, line 12, "product" should read --produce--.
Column 24, line 10, "79" (second occurrence) should read --78--.
Column 34, line 13 "conprise" should read --comprise--.
Column 36, line 25, after "produce" insert --at selected
    intervals one or more light signals to produce--.

Signed and Sealed this

Thirty-first Day of May 1983

[SEAL]

Attest:

DONALD J. QUIGG

Attesting Officer    Acting Commissioner of Patents and Trademarks